US008948382B2

(12) United States Patent
Hassan et al.

(10) Patent No.: US 8,948,382 B2
(45) Date of Patent: Feb. 3, 2015

(54) SECURE PROTOCOL FOR PEER-TO-PEER NETWORK

(75) Inventors: Amer A. Hassan, Kirkland, WA (US); Mitesh K. Desai, Redmond, WA (US); Yatharth Gupta, Bellevue, WA (US); Henrique Filgueiras, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 973 days.

(21) Appl. No.: 12/970,159

(22) Filed: Dec. 16, 2010

(65) Prior Publication Data

US 2012/0155643 A1  Jun. 21, 2012

(51) Int. Cl.
| | | |
|---|---|---|
| H04L 29/06 | (2006.01) | |
| H04W 12/06 | (2009.01) | |
| H04L 29/08 | (2006.01) | |
| H04L 9/32 | (2006.01) | |
| H04L 9/00 | (2006.01) | |
| H04L 9/08 | (2006.01) | |
| H04W 12/04 | (2009.01) | |

(52) U.S. Cl.
CPC .............. *H04L 9/321* (2013.01); *H04L 9/083* (2013.01); *H04W 12/04* (2013.01); *H04W 12/06* (2013.01); *H04L 67/1093* (2013.01); *H04L 67/1046* (2013.01)
USPC .............. 380/45; 713/156; 713/169; 380/282

(58) Field of Classification Search
USPC .............................................. 380/282; 726/4
See application file for complete search history.

(56) References Cited

U.S. PATENT DOCUMENTS

| | | |
|---|---|---|
| 4,949,299 A | 8/1990 | Pickett |
| 5,682,382 A | 10/1997 | Shepard |
| 5,729,682 A | 3/1998 | Marquis et al. |

(Continued)

FOREIGN PATENT DOCUMENTS

| | | |
|---|---|---|
| CN | 1571341 A | 1/2005 |
| CN | 1592210 A | 3/2005 |

(Continued)

OTHER PUBLICATIONS

Leveraging Identity-Based Cryptography for Node ID Assignment in Structured P2P Systems Kevin R.B. Butler, Student Member, IEEE, Sunam Ryu, Patrick Traynor, Member, IEEE, and Patrick D. McDaniel, Senior Member, IEEE. IEEE Transactions on Parallel and Distributed Systems, vol. 20, No. 12, Dec. 2009.*

(Continued)

*Primary Examiner* — Shin-Hon Chen
(74) *Attorney, Agent, or Firm* — John Jardine; Alin Corie; Micky Minhas

(57) ABSTRACT

A wireless computing device operating as a controller of a peer-to-peer group configured to generate unique master keys for each device joining the group. The wireless computing device may use the unique master keys to selectively remove remote devices from the group such that the remote device cannot later rejoin the group. Other remote devices, each possessing a master key that remains valid, can disconnect from the group and later reconnect to the group without express user action. To support such behavior, the wireless device may provide a user interface through which a user may manage connected remote devices by providing commands to selectively disconnect or remove remote devices from the group.

20 Claims, 8 Drawing Sheets

(56) References Cited

U.S. PATENT DOCUMENTS

| | | |
|---|---|---|
| 6,288,749 B1 | 9/2001 | Freadman |
| 6,317,490 B1 | 11/2001 | Cameron et al. |
| 6,338,046 B1 | 1/2002 | Saari et al. |
| 6,343,205 B1 | 1/2002 | Threadgill et al. |
| 6,553,060 B2 | 4/2003 | Souissi et al. |
| 6,628,965 B1 | 9/2003 | Larosa et al. |
| 6,665,709 B1 | 12/2003 | Barron |
| 6,711,617 B1 | 3/2004 | Bantz et al. |
| 6,789,228 B1 | 9/2004 | Merril et al. |
| 6,823,379 B1 | 11/2004 | Heckel et al. |
| 7,020,472 B2 | 3/2006 | Schmidt |
| 7,027,808 B2 | 4/2006 | Wesby |
| 7,058,696 B1 | 6/2006 | Phillips et al. |
| 7,107,009 B2 | 9/2006 | Sairanen et al. |
| 7,110,843 B2 | 9/2006 | Pagnano et al. |
| 7,177,288 B2 | 2/2007 | Mooney et al. |
| 7,194,278 B1 | 3/2007 | Cook |
| 7,280,978 B1 | 10/2007 | Joao |
| 7,290,132 B2 | 10/2007 | Aboba |
| 7,349,342 B2 | 3/2008 | Carpenter et al. |
| 7,412,534 B2 | 8/2008 | Tsang et al. |
| 7,461,253 B2 * | 12/2008 | Braskich et al. ............. 713/169 |
| 7,496,637 B2 | 2/2009 | Han et al. |
| 7,558,604 B2 | 7/2009 | Narayanaswami et al. |
| 7,577,125 B2 | 8/2009 | Abhishek |
| 7,589,693 B2 | 9/2009 | Locke |
| 7,640,213 B2 | 12/2009 | Reunert et al. |
| 7,721,093 B2 | 5/2010 | Sundararajan |
| 7,769,394 B1 | 8/2010 | Zhu |
| 7,925,739 B2 | 4/2011 | Kocho et al. |
| 7,962,854 B2 | 6/2011 | Vance et al. |
| 8,014,415 B2 | 9/2011 | Alapuranen |
| 8,095,111 B2 | 1/2012 | Henry, Jr. et al. |
| 8,260,998 B2 | 9/2012 | Ganesh et al. |
| 8,285,250 B2 | 10/2012 | Rubin et al. |
| 8,323,040 B2 | 12/2012 | Prest |
| 8,326,958 B1 | 12/2012 | Raleigh |
| 8,397,982 B2 | 3/2013 | Slaby et al. |
| 8,437,736 B2 | 5/2013 | Rubin et al. |
| 8,633,616 B2 | 1/2014 | Soar |
| 8,659,565 B2 | 2/2014 | Sirpal et al. |
| 2001/0021950 A1 | 9/2001 | Hawley et al. |
| 2001/0037399 A1 | 11/2001 | Eylon et al. |
| 2001/0042124 A1 | 11/2001 | Barron |
| 2001/0046298 A1 | 11/2001 | Terada et al. |
| 2002/0067268 A1 | 6/2002 | Lee et al. |
| 2002/0116485 A1 | 8/2002 | Black et al. |
| 2002/0120935 A1 | 8/2002 | Huber et al. |
| 2002/0143819 A1 | 10/2002 | Han et al. |
| 2002/0154751 A1 | 10/2002 | Thompson et al. |
| 2003/0142651 A1 | 7/2003 | Matta et al. |
| 2003/0187992 A1 | 10/2003 | Steenfeldt et al. |
| 2004/0002305 A1 | 1/2004 | Byman-Kivivuori et al. |
| 2004/0006606 A1 | 1/2004 | Marotta et al. |
| 2004/0049576 A1 | 3/2004 | Schweitzer et al. |
| 2004/0061716 A1 | 4/2004 | Cheung et al. |
| 2004/0174395 A1 | 9/2004 | Liu |
| 2004/0198374 A1 | 10/2004 | Bajikar |
| 2004/0203815 A1 | 10/2004 | Shoemake et al. |
| 2004/0210320 A1 | 10/2004 | Pandya |
| 2005/0028208 A1 | 2/2005 | Ellis et al. |
| 2005/0071319 A1 | 3/2005 | Kelley et al. |
| 2005/0083975 A1 | 4/2005 | Macri |
| 2005/0105632 A1 | 5/2005 | Catreux-Erces et al. |
| 2005/0135235 A1 | 6/2005 | Maruyama et al. |
| 2005/0177715 A1 * | 8/2005 | Somin et al. ................. 713/156 |
| 2005/0198238 A1 | 9/2005 | Sim et al. |
| 2005/0221844 A1 | 10/2005 | Trethewey et al. |
| 2005/0223226 A1 | 10/2005 | Sundararajan |
| 2005/0249266 A1 | 11/2005 | Brown et al. |
| 2006/0015904 A1 | 1/2006 | Marcus |
| 2006/0041916 A1 | 2/2006 | Mcquaide |
| 2006/0059462 A1 | 3/2006 | Yamamoto |
| 2006/0143027 A1 | 6/2006 | Jagannathan et al. |
| 2006/0145815 A1 | 7/2006 | Lanzieri et al. |
| 2006/0239208 A1 | 10/2006 | Roberts et al. |
| 2006/0294112 A1 | 12/2006 | Mandato et al. |
| 2007/0054616 A1 | 3/2007 | Culbert |
| 2007/0057793 A1 | 3/2007 | Alden |
| 2007/0064604 A1 | 3/2007 | Chen et al. |
| 2007/0124485 A1 | 5/2007 | Frost et al. |
| 2007/0153695 A1 | 7/2007 | Gholmieh et al. |
| 2007/0153729 A1 | 7/2007 | Alapuranen |
| 2007/0161411 A1 | 7/2007 | Liao et al. |
| 2007/0171915 A1 | 7/2007 | Toyama et al. |
| 2007/0192735 A1 | 8/2007 | Lehto et al. |
| 2007/0207750 A1 | 9/2007 | Brown et al. |
| 2007/0223398 A1 | 9/2007 | Luo et al. |
| 2007/0225831 A1 | 9/2007 | Sakurada |
| 2007/0248179 A1 | 10/2007 | Hassan et al. |
| 2007/0254628 A1 | 11/2007 | Rybak |
| 2007/0271525 A1 | 11/2007 | Han et al. |
| 2007/0274488 A1 | 11/2007 | Callaghan |
| 2007/0280332 A1 | 12/2007 | Srikanteswara et al. |
| 2007/0280481 A1 | 12/2007 | Eastlake |
| 2008/0002658 A1 | 1/2008 | Soliman |
| 2008/0016338 A1 | 1/2008 | Sun |
| 2008/0055399 A1 | 3/2008 | Woodworth et al. |
| 2008/0063204 A1 | 3/2008 | Braskich et al. |
| 2008/0081597 A1 | 4/2008 | Cole |
| 2008/0104170 A1 | 5/2008 | Ananthanarayanan |
| 2008/0130519 A1 | 6/2008 | Bahl et al. |
| 2008/0130639 A1 | 6/2008 | Costa-Requena et al. |
| 2008/0152098 A1 | 6/2008 | Paryzek et al. |
| 2008/0197802 A1 | 8/2008 | Onishi et al. |
| 2008/0207119 A1 | 8/2008 | Chang |
| 2008/0207128 A1 | 8/2008 | Mikko |
| 2008/0227384 A1 | 9/2008 | Placzek et al. |
| 2008/0252419 A1 | 10/2008 | Batchelor et al. |
| 2008/0275993 A1 | 11/2008 | Mohammed et al. |
| 2008/0293375 A1 | 11/2008 | Swanburg |
| 2008/0293419 A1 | 11/2008 | Somasundaram et al. |
| 2008/0311952 A1 | 12/2008 | Sugiyama |
| 2008/0319857 A1 | 12/2008 | Dobbins et al. |
| 2009/0011738 A1 | 1/2009 | Sasakura |
| 2009/0013175 A1 | 1/2009 | Elliott |
| 2009/0039828 A1 | 2/2009 | Jakubowski |
| 2009/0045913 A1 | 2/2009 | Nelson et al. |
| 2009/0055266 A1 | 2/2009 | Brody et al. |
| 2009/0089885 A1 | 4/2009 | Noble et al. |
| 2009/0100080 A1 | 4/2009 | Toms et al. |
| 2009/0103481 A1 | 4/2009 | Mahajan |
| 2009/0106542 A1 | 4/2009 | Dubs et al. |
| 2009/0111378 A1 | 4/2009 | Sheynman et al. |
| 2009/0138715 A1 | 5/2009 | Xiao et al. |
| 2009/0144622 A1 | 6/2009 | Evans et al. |
| 2009/0154343 A1 | 6/2009 | Fitch et al. |
| 2009/0158394 A1 * | 6/2009 | Oh et al. ........................ 726/3 |
| 2009/0170431 A1 | 7/2009 | Pering et al. |
| 2009/0196180 A1 | 8/2009 | Bahl et al. |
| 2009/0210940 A1 | 8/2009 | Dean |
| 2009/0303902 A1 | 12/2009 | Liu et al. |
| 2009/0319663 A1 | 12/2009 | Giles et al. |
| 2010/0049971 A1 | 2/2010 | Oh |
| 2010/0100637 A1 | 4/2010 | Bowra et al. |
| 2010/0103850 A1 | 4/2010 | Gossain et al. |
| 2010/0104078 A1 | 4/2010 | Henry, Jr. et al. |
| 2010/0110890 A1 | 5/2010 | Rainer et al. |
| 2010/0111033 A1 | 5/2010 | Erceg et al. |
| 2010/0115278 A1 | 5/2010 | Shen |
| 2010/0121744 A1 | 5/2010 | Belz et al. |
| 2010/0144274 A1 | 6/2010 | Mcdowall et al. |
| 2010/0153762 A1 | 6/2010 | Radulescu et al. |
| 2010/0175101 A1 | 7/2010 | Devictor et al. |
| 2010/0186066 A1 | 7/2010 | Pollard |
| 2010/0191576 A1 | 7/2010 | Raleigh |
| 2010/0191847 A1 | 7/2010 | Raleigh |
| 2010/0195580 A1 | 8/2010 | Samarasooriya et al. |
| 2010/0198952 A1 | 8/2010 | Kneckt et al. |
| 2010/0220856 A1 | 9/2010 | Kruys |
| 2010/0226253 A1 | 9/2010 | Bugenhagen |
| 2010/0232332 A1 | 9/2010 | Abdel-Kader |
| 2010/0257251 A1 | 10/2010 | Mooring et al. |
| 2010/0284316 A1 | 11/2010 | Sampathkumar |

(56) References Cited

U.S. PATENT DOCUMENTS

| | | |
|---|---|---|
| 2010/0333032 A1 | 12/2010 | Lau et al. |
| 2011/0275316 A1 | 2/2011 | Suumaeki et al. |
| 2011/0107388 A1 | 5/2011 | Lee et al. |
| 2011/0145581 A1 | 6/2011 | Malhotra et al. |
| 2011/0149806 A1 | 6/2011 | Verma et al. |
| 2011/0176463 A1 | 7/2011 | Cowan et al. |
| 2011/0188419 A1 | 8/2011 | Filoso et al. |
| 2011/0188420 A1 | 8/2011 | Filoso et al. |
| 2011/0238498 A1 | 9/2011 | Hassan et al. |
| 2011/0261001 A1 | 10/2011 | Liu |
| 2011/0274020 A1 | 11/2011 | Filoso et al. |
| 2011/0280413 A1 | 11/2011 | Wu et al. |
| 2011/0293095 A1 | 12/2011 | Ben Ayed |
| 2011/0320963 A1 | 12/2011 | Wong |
| 2011/0321126 A1 | 12/2011 | Maniatopoulos |
| 2012/0101952 A1 | 4/2012 | Raleigh et al. |
| 2012/0139690 A1 | 6/2012 | Gupta et al. |
| 2012/0144083 A1 | 6/2012 | Hassan et al. |
| 2012/0147268 A1 | 6/2012 | Hassan et al. |
| 2012/0147274 A1 | 6/2012 | Hassan et al. |
| 2012/0147825 A1 | 6/2012 | Hassan et al. |
| 2012/0157038 A1 | 6/2012 | Menezes et al. |
| 2012/0158839 A1 | 6/2012 | Hassan et al. |
| 2012/0158947 A1 | 6/2012 | Hassan et al. |
| 2012/0158981 A1 | 6/2012 | Desai et al. |
| 2012/0178429 A1 | 7/2012 | Camps Mur et al. |
| 2012/0197792 A1 | 8/2012 | Raleigh |
| 2013/0033800 A1 | 2/2013 | Bartnik et al. |
| 2013/0097422 A1* | 4/2013 | Salomone ............ 713/168 |
| 2013/0182614 A1* | 7/2013 | Kumar et al. ........... 370/255 |

FOREIGN PATENT DOCUMENTS

| | | |
|---|---|---|
| CN | 1607780 A | 4/2005 |
| CN | 1677975 A | 10/2005 |
| CN | 1929424 A | 3/2007 |
| CN | 1960474 A | 5/2007 |
| CN | 101021774 A | 8/2007 |
| CN | 101075820 A | 11/2007 |
| CN | 101094140 A | 12/2007 |
| CN | 101137960 A | 3/2008 |
| CN | 101147308 A | 3/2008 |
| CN | 101179359 A | 5/2008 |
| CN | 101288063 A | 10/2008 |
| CN | 101657828 A | 2/2010 |
| CN | 101841637 A | 9/2010 |
| CN | 101867623 A | 10/2010 |
| EP | 2256663 A | 12/2010 |
| GB | 2418809 A | 4/2006 |
| JP | 2005295286 A | 10/2005 |
| JP | 2005341094 A | 12/2005 |
| JP | 2006050216 A | 2/2006 |
| KR | 2008032979 A | 4/2008 |
| KR | 20100038089 A | 4/2010 |
| WO | 0154342 A | 7/2001 |
| WO | 2008021855 A2 | 2/2008 |
| WO | 2008089854 A | 7/2008 |
| WO | 2008127507 A | 10/2008 |
| WO | 2009046869 A | 4/2009 |
| WO | 2010044599 A | 4/2010 |

OTHER PUBLICATIONS

Non-Final Office Action mailed May 30, 2013 in U.S. Appl. No. 12/970,034 (MS# 331546.01), 22 pages.

Notice of Allowance mailed Jul. 12, 2013 in U.S. Appl. No. 12/967,761 (MS# 331547.01), 12 pages.

Non-Final Office Action mailed Aug. 14, 2013 in U.S. Appl. No. 121967,638 (MS# 330924.01), 30 pages.

Non-Final Office Action mailed Aug. 16, 2013 in U.S. Appl. No. 12/970,069 (MS# 331230.01), 26 pages.

"International Search Report", Mailed Date: Aug. 14, 2012, Application No. PCT/US2011/065276, Filed Date: Dec. 15, 2011, pp. 9. (MS# 331260.02).

Final Office Action mailed Sep. 23, 2013 in U.S. Appl. No. 12/970,034 (MS# 331546.01), 22 pages.

Wi-Fi Alliance: FAQs—Published Date: 2010 http://www.wi-fi.org/knowledge_center_overview.php?type=2.

Symbian Foundation Peer-to-Peer WiFi Inititative (WiFi Direct)—Published Date: Sep. 10, 2010 http://developer.symbian.org/wiki/index.php/Symbian_Foundation_Peer-to-Peer_WiFi_Inititative_%28WiFi_Direct%29.

802.11 Fast BSS Transition (FT) Part 1 of 2—Published Date: Aug. 21, 2007 http://www.cwnp.com/index/cwap_wifi_blog/5023.

Guide to IEEE 802.11i: Establishing Robust Security Networks—Published Date: Jun. 2006 http://www.leetupload.com/database/Misc/Papers/WIRELESS/SHELF/ieee802.11i.pdf.

CRTDH—An Efficient Key Agreement Scheme for Secure Group Communications in Wireless Ad Hoc Networks—Published Date: 2005 http://citeseerx.ist.psu.edu/viewdoc/download?doi=10.1.1.112.8&rep=rep1&type=pdf.

Wi-Fi Certified Wi-Fi Direct Personal Portable Wi-Fi Technology, Oct. 2010 pp. 1-14.

VAS Subscription Manager; Retrieved Date: Jan. 12, 2010; 1 page.

Wi-Fi Certified Wi-Fi Direct Personal Portable Wi-Fi Technology, Oct. 2010, pp. 1-14.

WinLIRC; Published Date: Mar. 17, 2008; 5 pages.

Wireless PC to TV; Retrieved Date: Sep. 9, 2010; 2 pages.

Wood, "Kowari: A Platform for Semantic Web Storage and Analysis", May 27, 2005, 16 pages.

Yuan, Y. et al., "Allocating Dynamic Time-Spectrum Blocks in Cognitive Radio Networks," Sep. 9-14, 2007, 10 pages.

"International Search Report", Mailed Date: Jul. 12, 2012, Application No. PCT/US2011/063207, Filing Date: Dec. 4, 2011, pp. 9, (MS# 330927.02).

"International Search Report", Mailed Date: Jun. 22, 2012, Application No. PCT/US20111063340, Filed Date: Dec. 5, 2011, pp. 9. (MS# 331550.02).

"Omnidrive", 2006, retrieved Oct. 26, 2006, 2 pages.

"Xdrive", 2006, retrieved Oct. 26, 2006, 2 pages.

02 Network Scraps Unlimited Data for Smartphones; Published Date: Jun. 10, 2010; 2 pages.

A New Location Technique for the Active Office—Published Date: 1997, http://citeseerx.ist.nsu.edu/viewdoc/download?doi=10.1.1.20.5052&rep=rep1&type=pdf.

Advisory Action mailed Jan. 2, 2013 in U.S. Appl. No. 11/726,862 (MS# 318586.01), 3 pages.

Cisco Systems, Inc., "802.11 n Wireless Technology Overview," 2007, 7 pages.

Creating Customized Web Experiences with Windows Media Player 9 Series; Published Date: Nov. 2002; 1 page.

Final Office Action mailed Nov. 13, 2012 in U.S. Appl. No. 12/748,829 (MS# 328740.01), 42 pages.

Final Office Action mailed Nov. 15, 2010 in U.S. Appl. No. 11/726,862 (MS# 318586.01), 21 pages.

Final Office Action mailed Feb. 15, 2013 in U.S. Appl. No. 12/967,761 (MS# 331547.01), 28 pages.

Final Office Action mailed Feb. 15, 2013 in U.S. Appl. No. 12/970,069 (MS# 331230.01), 23 pages.

Final Office Action mailed Mar. 28, 2013 in U.S. Appl. No. 12/967,638 (MS# 330924.01), 22 pages.

Final Office Action mailed Sep. 15, 2011 in U.S. Appl. No. 11/726,862 (MS# 318586.01), 24 pages.

Final Office Action mailed Sep. 20, 2012 in U.S. Appl. No. 11/726,862 (MS# 318586.01), 35 pages.

How Do You Use a Laptop As a TV Remote Control?; Published Date: Jul. 15, 2008; 6 pages.

International Search Report mailed Jul. 24, 2012 in PCT Application No. PCT/US2011/065691 (MS# 330919.02), Filing Date: Dec. 17, 2011, 11 pages.

International Search Report mailed Sep. 5, 2012 in PCT Application No. PCT/US20111065692 (MS# 330920.02), Filing Date: Dec. 17, 2011, 8 pages.

International Search Report; Mailed Date: Aug. 31, 2012; Application No. PCT/US2011/064753; Filed Date: Dec. 14, 2011, pp. 8, (MS# 331547.02).

(56) References Cited

OTHER PUBLICATIONS

International Search Report; Mailed Date: Jul. 31, 2012; Application No. PCT/US2011/065285; Filed Date: Dec. 15, 2011, pp. 9. (MS# 331546.02).
Manage Subscription Products & Automate Recurring Billing Operations; Copyright 2008-2009; Retrieved Date: Jan. 12, 2010, 1 page.
Manifest Permission; Published Date: Jul. 21, 2004; 19 pages.
Meinrath et al.; "Unlicensed 'White Space Device' Operations on the TV Band and the Myth of Harmful Interferences", Mar. 2008, 13 pages.
Menezes, Pascal; "Operating System Supporting Cost Aware Applications"; U.S. Appl. No. 13/844,932 (MS# 330919.04); Filed Mar. 16, 2013; 57 pages.
MIST: Cellular Data Network Measurement for Mobile Applications; Published Date: Apr. 24, 2006; 9 pages.
Mobile Internet Usage Measurements—Case Finland; Published Date: Apr. 24, 2006; 140 pages.
Mohammed, "Web Service for User and Subscription Data Storage", U.S. Appl. No. 13/772,275, filed Feb. 20. 2013, 49 pages.
Motorola, "TV White Space Position Paper," 2008, 10 pages.
Non-Final Office Action mailed Jan. 4, 2013 in U.S. Appl. No. 12/960,730 (MS# 330927.01), 14 pages.
Non-Final Office Action mailed Oct. 2, 2012 in U.S. Appl. No. 12/967,638 (MS# 330924.01), 33 pages.
Non-Final Office Action mailed Oct. 16, 2012 in U.S. Appl. No. 12/970,069 (MS# 331230.01), 23 pages.
Non-Final Office Action mailed Oct. 26, 2012 in U.S. Appl. No. 12/967,761 (MS# 331547.01), 24 pages.
Non-Final Office Action mailed Apr. 11, 2013 in U.S. Appl. No. 12/972,104 (MS# 330920.01), 15 pages.
Non-Final Office Action mailed Apr. 14, 2011 in U.S. Appl. No. 11/726,862 (MS# 318586.01), 22 pages.
Non-Final Office Action mailed Apr. 5, 2012 in U.S. Appl. No. 11/726,862 (MS# 318586.01), 23 pages.
Non-Final Office Action mailed Jun. 23, 2010 in U.S. Appl. No. 11/726,862 (MS# 318586.01), 16 pages.
Non-Final Office Action mailed Aug. 9, 2012 in U.S. Appl. No. 12/748,829 (MS# 328740.01), 29 pages.
Non-Final Office Action mailed Sep. 24, 2012 in U.S. Appl. No. 12/964,492 (MS# 331550.01), 10 pages.
Non-Final Office Action mailed Sep. 6, 2012 in U.S. Appl. No. 12/972,230 (MS# 330919.01), 10 pages.
Notice of Allowance mailed Nov. 20, 2012 in U.S. Appl. No. 12/972,230 (MS# 330919.01), 9 pages.
Notice of Allowance mailed Mar. 20, 2013 in U.S. Appl. No. 12/964,492 (MS# 331550.01), 9 pages.
Notice of Allowance mailed Mar. 25, 2013 in U.S. Appl. No. 12/972,230 (MS# 330919.01), 8 pages.
Notice of Allowance mailed Mar. 4, 2013 in U.S. Appl. No. 12/972,230 (MS# 330919.01), 7 pages.
Shared Spectrum, Inc., "Our Technology," Nov. 2010, 2 pages.
Shih, Eugene et al.; Wake on Wireless: An Event Driven Energy Saving; Published Date: Sep. 23-26, 2002; 12 pages.
Sridhar, T.; Wi-Fi, Bluetooth and WiMAX; The Internet Protocol Journal, vol. 11, No. 4; Retrieved Date: Sep. 30, 2010, 9 pages.
Subscription Management; Copyright 2009; Retrieved Date: Jan. 12, 2010; 2 pages.
T-mobile "Unlimited" Data Usage; Published Date: Mar. 9, 2010; 6 pages.
Torres Service Management Platform; Retrieved Date: Jan. 12, 2010; 2 pages.
Final Office Action mailed Dec. 26, 2013 in U.S. Appl. No. 12/967,638 (MS# 330924.01), 34 pages.
. Chinese Office Action mailed Nov. 20, 2013 in CN Patent App. No. 201110423001.3 (MS No. 33154603), 18 pages including translation.
Chinese Office Action mailed Dec. 4, 2013 in CN Patent App. No. 201110423031.4 (MS No. 33123002), 26 pages including translation.
Final Office Action mailed Feb. 11, 2014 in U.S. Appl. No. 12/970,069 (MS# 331230.01), 26 pages.
U.S. Appl. No. 12/972,230, filed Dec. 17, 2010, Menezes et al.
U.S. Appl. No. 12/972,104, filed Dec. 17, 2010, Hassan et al.
U.S. Appl. No. 12/967,638, filed Dec. 14, 2010, Hassan et al.
U.S. Appl. No. 12/960,730, filed Dec. 6, 2010, Gupta et al.
U.S. Appl. No. 12/970,034, filed Dec. 16, 2010, Hassan et al.
U.S. Appl. No. 12/960,753, filed Dec. 6, 2010, Hassan et al.
U.S. Appl. No. 12/967,761, filed Dec. 14, 2010, Hassan et al.
U.S. Appl. No. 12/964,492, filed Dec. 9, 2010, Hassan et al.
U.S. Appl. No. 12/970,069, filed Dec. 16, 2010, Hassan et al.
Chinese Office Action mailed Feb. 17, 2014 in CN Patent App. No. 201110400433.2 (MS No. 330927.03), 12 pages including partial translation.
Non-Final Office Action mailed Nov. 6, 2013 in U.S. Appl. No. 12/960,730 (MS# 330927.01), 16 pages.
Chinese Office Action mailed Feb. 27, 2014 in CN Patent App. No. 201110400472.2 (MS No. 33154402), 13 pages including Concise Explanation of Relevance and partial translation.
Notice of Allowance mailed Apr. 2, 2014 in U.S. Appl. No. 12/964,492 (MS# 331550.01), 9 pages.
Meinrath et al.; "White Space Devices" & The Myths of Harmful Interference, 11 N.Y.U.J. Legis&Pub. Policy 495, 2008, 24 pages.
Non-Final Office Action mailed May 23, 2014 in U.S. Appl. No. 12/748,829 (MS# 328740.01), 30 pages.
Non-Final Office Action mailed May 23, 2014 in U.S. Appl. No. 12/960,730 (MS# 330927.01), 18 pages.
Office Action dated Apr. 3, 2014 in CN Pat. App. No. 201110417153.2 (MS# 331547.03), 15 pages, including partial translation and/or concise explanation of relevance.
Office Action dated Apr. 1, 2014 in CN Pat. App. No. 201110423001.3 (MS# 331546.03), 8 pages, including partial translation.
Final Office Action mailed Oct. 25, 2013 in U.S. Appl. No. 12/972,104 (MS# 330920.01), 10 pages.
Non-Final Office Action mailed Nov. 8, 2013 in U.S. Appl. No. 13/844,932 (MS# 330919.04), 6 pages.
Chinese Office Action mailed Dec. 4, 2013 in CN Patent App. No. 201110408217.2 (MS No. 33155003), 12 pages, including Concise Explanation of Relevance and/or partial translation.
Notice of Allowance mailed Mar. 6, 2014 in U.S. Appl. No. 12/967,638 (MS# 330924.01), 11 pages.
Chinese Office Action mailed Jan. 6, 2013 in CN Patent App. No. 201110423068.7 (MS No. 331260.06), 8 pages including concise explanation of relevance and partial translation.
"Second Office Action Issued in Chinese Patent Application No. 201110408217.2", Mailed Date: May 23, 2014, Filed Date: Dec. 9, 2011, 8 Pages including partial translation.
Non-Final Office Action mailed Jun. 18, 2014 in U.S. Appl. No. 12/960,753, 12 pages.
Non-Final Office Action mailed Jun. 9, 2014 in U.S. Appl. No. 12/970,069, 20 pages.
Texas Instruments, MSP430 Ultra-Low-Power MCUs and TI-RFid Devices, 2 pages, 2009.
Araujo, Joao Taveira et al., "Towards Cost-Aware Multipath Routing," AIMS 2009, LNCS 5637, 2009, pp. 207-210.
Chinese Office Action dispatched Dec. 4, 2013 in CN Patent Application No. 201110426187.8, 8 pages including Concise Explanation of Relevance and/or partial translation.
Chinese Office Action dispatched Feb. 28, 2014 in CN Patent Application No. 201110426179.3, 9 pages including Concise Explanation of Relevance and/or partial translation.
Chinese Office Action mailed Jul. 11, 2014 in CN Patent App. No. 201110423031.4, 13 pages, including partial translation and/or concise explanation of relevance.
Extended European Search Report dated May 20, 2014 in EP Patent App. No. 11847426.1, 8 pages.
Haas, Robert et al., "Cost-and Quality-of-Service-Aware Network-Service Deployment," 2001, 6 pages.
Lun, Desmond S. et al., "Network Coding with a Cost Criterion," MIT LIDS Technical Report P-2584, Apr. 2004, 18 pages.
Menezes, Pascal; "Operating System Supporting Cost Aware Applications"; U.S. Appl. No. 14/318,380; filed Mar. 16, 2013; 56 pages.

(56) References Cited

OTHER PUBLICATIONS

Non-Final Office Action mailed Jun. 20, 2014 in U.S. Appl. No. 12/972,104, 10 pages.
Non-Final Office Action mailed Jul. 18, 2014 in U.S. Appl. No. 12/970,034, 24 pages.
Notice of Allowance mailed Dec. 26, 2013 in U.S. Appl. No. 12/972,230, 8 pages.
Notice of Allowance mailed Feb. 19, 2014 in U.S. Appl. No. 13/844,932, 8 pages.
Notice of Allowance mailed Mar. 10, 2014 in U.S. Appl. No. 12/972,230, 8 pages.
Notice of Allowance mailed May 7, 2014 in U.S. Appl. No. 13/844,932, 7 pages.
Office Action dated Jun. 5, 2014 in CN Pat. App. No. 201110417226.8, 14 pages, including partial translation and/or concise explanation of relevance.
Pawar, Pravin et al. "Towards Location based QoS-Aware Network Selection Mechanism for the Nomadic Mobile Services," Dec. 5, 2009, 5 pages.
Non-Final Office Action mailed Aug. 5, 2014 in U.S. Appl. No. 13/844,932, 7 pages.
Notice of Allowance mailed Jul. 24, 2014 in U.S. Appl. No. 12/972,230, 7 pages.
Notice of Allowance mailed Aug. 20, 2014 in U.S. Appl. No. 12/964,492, 13 pages.
Chinese Office Action mailed Aug. 5, 2014 in CN Patent App. No. 201110426179.3, 6 pages, including partial translation.
Notice of Allowance mailed Sep. 17, 2014 in U.S. Appl. No. 12/972,230, 7 pages.
Non-Final Office Action mailed Sep. 29, 2014 in U.S. Appl. No. 12/748,829, 30 pages.
Non-Final Office Action mailed Oct. 2, 2014 in U.S. Appl. No. 14/318,380, 5 pages.
Chinese Office Action mailed Sep. 2, 2013 in CN Patent App. No. 201110408217.2, 6 pages, including partial translation.
Chinese Office Action mailed Sep. 4, 2014 in CN Patent App. No. 201110423001.3, 6 pages, including partial translation.
Chinese Office Action mailed Sep. 2, 2014 in CN Patent App. No. 201110408217.2, 6 pages, including partial translation.
Final Office Action mailed Oct. 6, 2014 in U.S. Appl. No. 12/972,104, 10 pages.
Chinese Office Action mailed Sep. 9, 2014 in CN Patent App. No. 201110400433.2, 13 pages including partial translation.
Non-Final Office Action mailed Oct. 27, 2014 in U.S. Appl. No. 13/772,275, 14 pages.
Notice of Allowance mailed Nov. 12, 2014 in U.S. Appl. No. 13/844,932, 8 pages.
"Office Action and Search Report Issued in Chinese Patent Application No. 201110400472.2", Mailed Date: Oct. 27, 2014, 14 Pages.

\* cited by examiner

SECURE PROTOCOL FOR PEER-TO-PEER NETWORK

BACKGROUND

Many computers today have radios to support wireless communication. Wireless communication is used, for example, to connect to an access point of a network. By associating with the access point, a wireless computer can access devices on the network or on other networks reachable through that network, such as the Internet. As a result, the wireless computer can exchange data with many other devices, enabling many useful functions.

To enable computers to be configured for association with an access point, it is common for the access points to operate according to a standard. A common standard for devices that connect to access points is called Wi-Fi. This standard was promulgated by the Wi-Fi Alliance, and is widely used in portable computers. There are multiple versions of this standard, but any of them can be used to support connections through access points.

Wireless communications may also be used to form connections directly to other devices without using an access point. These connections are sometimes called "peer-to-peer" connections and may be used, for example, to allow a computer to connect to a mouse or keyboard wirelessly. More generally, peer-to-peer connections may be used to establish a group of devices of any type that may communicate without requiring an infrastructure. Wireless communications for these direct connections also have been standardized. A common standard for such wireless communications is called BLUETOOTH®.

In some instances, a wireless computer may concurrently connect to other devices through an access point and as part of a group engaging in peer-to-peer communications. To support such concurrent communication, some computers have multiple radios. More recently a standard has been proposed, called Wi-Fi Direct, that enables both an infrastructure connection and communication as part of a peer-to-peer group with similar wireless communications that can be processed with a single radio. This standard, also published by the Wi-Fi Alliance, extends the popular Wi-Fi communications standard for infrastructure-based communications to support direct connections.

Equipping computing devices to support direct connections is expected to expand the scenarios in which a wireless computing device can connect to other wireless devices. For example, computer users working together may more readily form a group that allows the users to share data without requiring any specific infrastructure. Similarly, a computer may more readily connect wirelessly to a printer, camera or devices providing other desired services.

SUMMARY

Secure communications are achieved, with very low user burden, in a peer-to-peer group by configuring a device, capable of operating as a controller of the peer-to-peer group, to provide unique master keys for each remote device that joins the group. The group controller may selectively remove one or more remote devices from the group by selectively invalidating the master keys for the devices to be removed. Other remote devices may continue on in the peer-to-peer group without disruption or a need to re-form the group.

Upon removal of a device from the group, the group controller, in addition to invalidating a master key associated with the device, may invalidate other keys generated from the master key. If the removed device attempts to further communicate as part of the group, its communications will not be recognized because the group controller does not have a key that will decrypt those communications. If the removed device attempts to re-join the group, the group controller will not recognize the master key used by that remote device. When an unrecognized device attempts to join the group without a recognized master key, the group controller may deny access, require user input or take other security actions.

However, remote devices that retain their master keys may continue on in the group. Such devices may even disconnect from the group and, using their master keys that remain valid, reconnect with the group.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have recognized and appreciated a need for enhanced security in peer-to-peer groups. As peer-to-peer groups become more prevalent and are formed with protocols, such as the Wi-Fi Direct protocol, that are more powerful, usage patterns may create subtle security issues. However, it is undesirable for enhancing security to interfere with ease of use of peer-to-peer groups. Accordingly, the inventors have recognized and appreciated techniques to address security issues without significant impact on a user.

Security may be enhanced in a peer-to-peer group by equipping a device capable of acting as a controller for the group to generate a unique master key for each remote device connecting to the group. The controlling device may be further configured to selectively invalidate a master key for a device to be removed from the group, thereby preventing the removed device from later reconnecting to the group and possibly accessing data that a user of the removed device is not intended to view or creating other security issues. Other remote devices, for which a master key remains valid, can remain in the peer-to-peer group and even may disconnect and later reconnect in the group.

Such a controlling device may be readily implemented using known techniques for implementing a device controlling a peer-to-peer group, with modifications to support the generation, distribution and selective invalidation of unique master keys and to support selection of the appropriate unique master key for authentication of remote devices. A component to provide a user interface through which a user may control the selective invalidation of master keys may be included. However, each remote device may receive and use its unique master key in a conventional way such that enhanced security may be provided even with remote devices having conventional configurations.

As an example of how a subtle security issue may arise using conventional peer-to-peer techniques, FIG. 1 illustrates a peer-to-peer group formed in accordance with a peer-to-peer protocol. Such a peer-to-peer protocol may allow multiple wireless devices to connect without requiring any infrastructure.

Figure 1A:
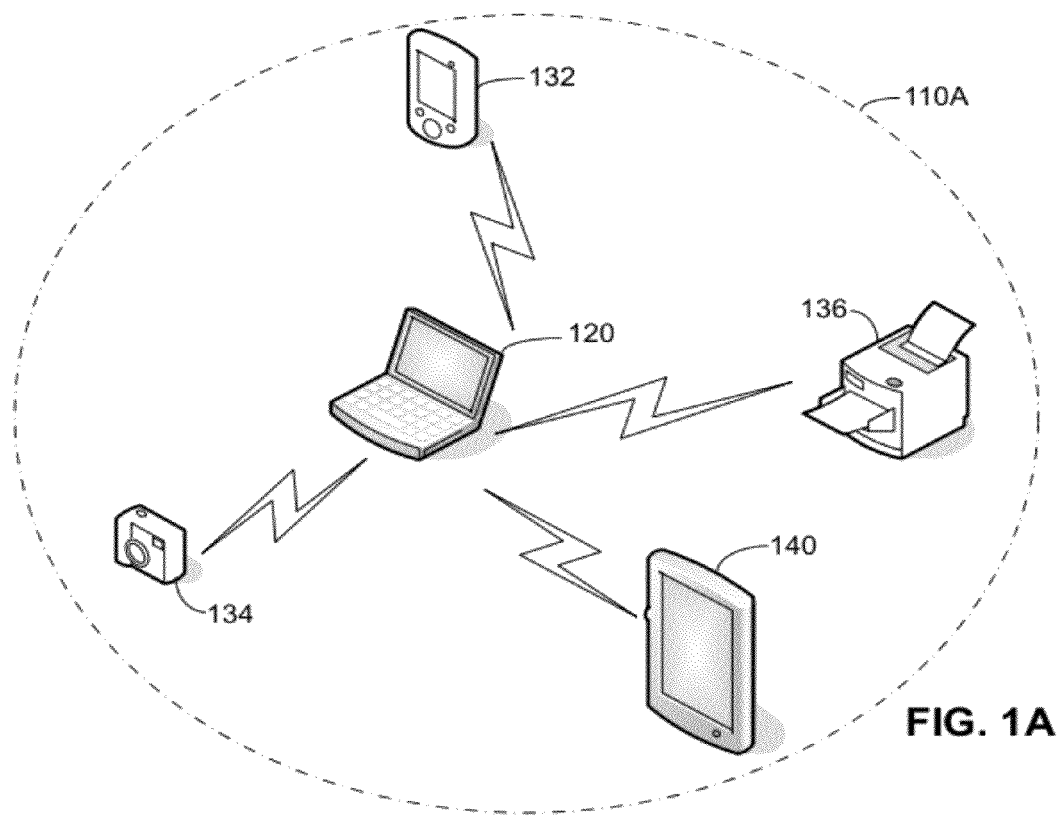
FIG. 1A is a sketch of an illustrative peer-to-peer group at a first time.

In the example of FIG. 1A, five devices have joined in a group 110A in accordance with the protocol. One device, in this example device 120, serves as a controller for the group. The controller may perform functions that allow other wireless devices to join the group. Those functions may include, for example, provisioning each device in the group with a group address, such that information may be routed to the device. Additionally, the group controller may provision other wireless devices in the group with security information that allows those devices to be authenticated as they join or re-join the group. Further, the security information may be used to encrypt communications between the device controlling the group and other devices in the group.

Any suitable device may control a group. In the embodiment illustrated in FIG. 1A, device 120 is a general purpose computing device, such as a laptop computer. Such a device may be readily configured to perform control operations as described herein. For example, such a computing device may be configured to perform operations associated with the control of a peer-to-peer group by appropriately configuring communication software in the computing device. Though, it should be appreciated that the form of computing device that controls the group is not critical to the invention. To the contrary, in accordance with some peer-to-peer protocols, including the Wi-Fi Direct protocol, the device that controls a group may be identified by a negotiation among the devices seeking to form a group such that any suitably equipped device may act as the group controller.

In the example of FIG. 1, remote devices 132, 134, 136 and 140 have joined in group 110A with computing device 120. As a result of negotiation among those devices in accordance with a peer-to-peer protocol, or based on any other suitable selection criteria, computing device 120 has been determined to be the controller of group 110A and remote devices 132, 134, 136 and 140 have been determined to be clients. Accordingly, computing device 120 has provisioned each of the remote devices 132, 134, 136 and 140 with an address and keys for communication with computing device 120 as part of peer-to-peer group 110A. The formation and operation of group 110A may be performed in accordance with a known standard or in any other suitable way.

As an example, computing device 120 may generate a master key for each of the remote devices 132, 134, 136 and 140. Conventionally, the same master key is provided to each of the devices that is admitted to group 110A. The master key may be distributed to each device authorized to join group 110A using a protocol that uses cryptographic techniques to avoid unauthorized entities from obtaining the master key. An example of such cryptographic techniques are reflected in a protocol called Wi-Fi protected setup (WPS). In that protocol, a user may input into computing device 120 a PIN or other identifying information for a remote device. Input of that information may signify to computing device 120 that a remote device is authorized by the user to join group 110A if the remote device similarly can demonstrate that it has a copy of the identifying information.

Input of a PIN or other identifying information provides computing device 120 with information shared with a remote device that is not obtainable by other devices in the vicinity. Accordingly, this information may be used in encrypting communications exchanged between computing device 120 and a remote device seeking to join network 110A. Through use of cryptographic techniques based on this information, computing device 120 may securely communicate the master key for group 110A to a remote device authorized to join group 110A.

Once a remote device has the master key for group 110A, the remote device can enter into a further exchange with computing device 120 to generate a transient key. Though the same master key is conventionally used for each of the remote devices in a group, a different transient key may be generated for each device. This transient key may then be used to encrypt and decrypt communications exchanged between the remote device for which the transient key was generated and computing device 120 acting as the controller for group 110A.

The exchange between computing device 120 and a remote device by which a transient key is generated may be performed according to any suitable protocol. An example of a suitable protocol is the Wi-Fi Protected Access (WPA2) protocol. An exchange of messages in accordance with this protocol, in addition to generating a transient key for a remote device, may also be used to authenticate that a device has the master key for the group.

Accordingly, a device that temporarily is disconnected from group 110A may re-join the group without further user authentication. Such a capability, may be particularly useful for groups involving portable electronic devices. Because peer-to-peer networking is generally performed with low power communications, when mobile devices are moved, sometimes as little as 10 or 50 feet, the devices forming the group may lose the ability to communicate. However, when the devices are brought back into proximity, a user may intend that the devices reconnect to re-form the group. In order to re-form the group, a remote device with the group master key may exchange communications with the device acting as the group controller in accordance with the WPA2 protocol, or other protocol used by the group, such that the remote device with the master key is authenticated to the device acting as the group controller and a new transient key is generated for that device.

The Applicants have recognized and appreciated that this flexibility to form and later re-form a group, though desirable in some scenarios, may be undesirable in other scenarios. FIG. 1A illustrates a scenario in which computing device 120, acting as a controller for group 110A is in close proximity to remote devices 132, 134 and 136. These remote devices, may represent other devices used by a user of computing device 120. For example, remote device 132 may be a Smartphone. Remote device 134 may be a camera, and remote device 136 may be a printer. The user of computing device 120 may intend that computing device 120 re-form a group including any or all of remote devices 132, 134 and 136 whenever computing device 120 is moved to be near those remote devices. In this way, for example, a user of computing device 120 may be able to print on the printer, represented as remote device 136. Similarly, the user may be able to upload pictures from the camera represented as remote device 134 or synchronize contact information with the Smartphone, represented as remote device 132.

So long as the user of computing device 120 controls the remote devices, little security risk is posed by allowing a group to be reformed without further user action. However, if a user of computing device 120 allows another remote device to join the group, even if that remote device is disconnected from the group, it may re-join the group at any time, which may not be a behavior expected or desired by a user of computing device 120.

For example, a user of computing device 120 may authorize remote device 140, representing another portable computing device, to join group 110A. Such authentication may be given to temporarily allow a user of computing device 140 to use device 136 to print a document or to access another of the remote devices in group 110A. Such authorization may be given to allow the user of computing device 140 to exchange a file or some other limited amount information with computing device 120. Though, once these actions are complete, particularly if remote device is disconnected from group 110A, a user of computing device 120 may neither expect nor want remote device 140 to rejoin group 110A.

The ability of a remote device to join a group without user authorization may pose a security issue in some circumstances. A security issue may be posed, for example, if a third party operating remote device 140 can access information on computing device 120 or other remote devices within group 110A. Moreover, a security issue may arise if remote device 140 can access information on other devices within group 110A. Further, a security issue may arise if remote device 140 can, through computing device 120 access services from computing device 120 or other remote devices in group 110A. As a specific example, the Wi-Fi Direct protocol allows a computing device, such as computing device 120 to be a member of a peer-to-peer group while being connected to an infrastructure network, such as may exist in an enterprise. If a third party using remote device 140 can access other networks to which computing device 120 is connected, security issues may be compounded.

Figure 1B:
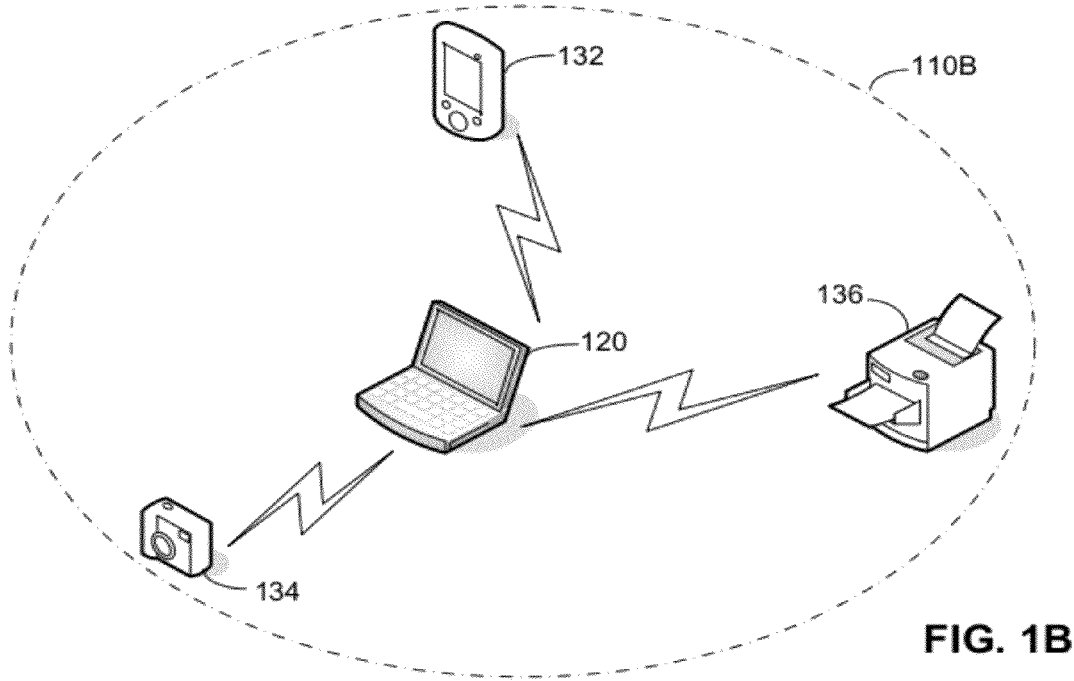
FIG. 1B is a sketch of an illustrative peer-to-peer group at a second time when a device has been removed from the group.

With a conventional implementation of a peer-to-peer group in which each remote device obtains a copy of a master key for the group, removing a remote device from the group, if a user of computing device 120 is even aware of the need to completely remove the device, would entail disbanding the group and forming a new peer-to-peer group. FIG. 1B shows that a new group 110B has been formed including remote devices 132, 134 and 136, but excluding remote device 140. Such a group may be formed by repeating the group formation steps, including obtaining user authorization to admit each of the devices 132, 134 and 136 into the group.

The applicants have recognized and appreciated that making a new group in order to remove a remote device may be undesirable for a user. Accordingly, in some embodiments, computing device 120 or other device that may act as a group controller may be configured such that a remote device may be removed from a group. A device that is removed from the group may not be able to re-join the group without re-authorization from a user.

Figure 1C:
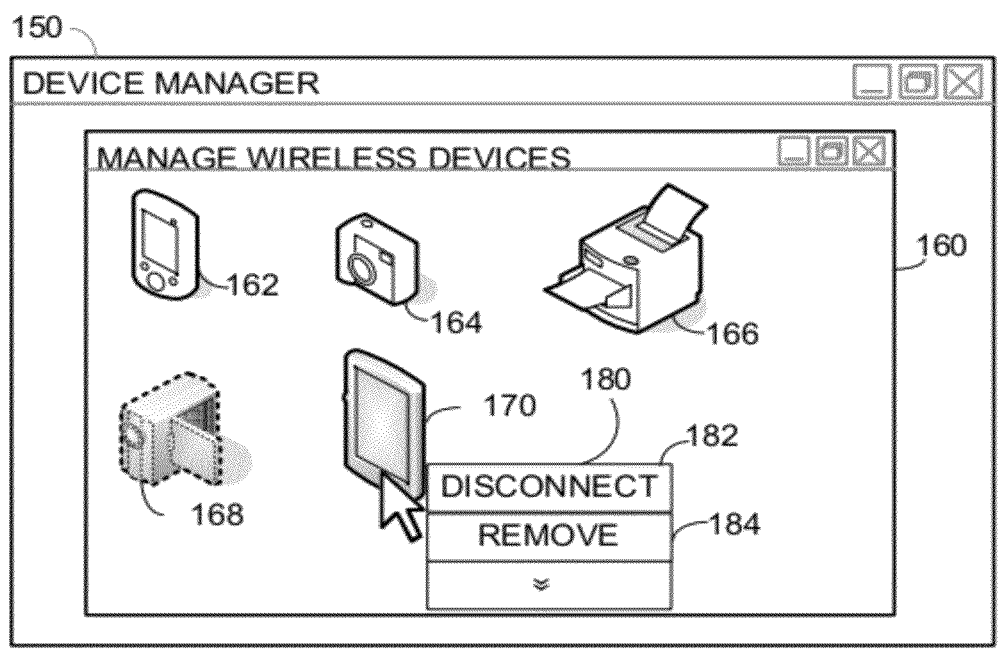
FIG. 1C is a sketch of a graphical user interface through which a user may input a command to remove a device from a peer-to-peer group.

As an example, computing device 120 may be configured with components that represent a graphical user interface through which a user may input a command to remove a remote device from a group. FIG. 1C shows a graphical user interface 150 through which a user may input such a command.

In the example of FIG. 1C, the user interface 150 may be a portion of a user interface presented by a device manager component executing within the operating system of computing device 120. Such a user interface may be presented in response to user input indicating a desire to provide commands related to devices installed in or coupled to computing device 120. Through such a device manager interface, the user may select a display area 160 relating to managing wireless devices in a group involving computing device 120.

In the embodiment illustrated, each of the devices actively in the group 110A is illustrated in display area 160 by an icon. In this example, icon 162 represents remote device 132. Icon 164 represents remote device 134. Icon 166 represents remote device 136. Icon 170 represents remote device 140. Additionally, display area 160 contains an icon 168.

Icon 168 is shown in a fashion that is visually distinct from the icons 162, 164, 166 and 170. The different visual presentation of icon 168 may represent that a device corresponding to icon 168 is not actively connected in the group 110A at the time display area 160 was rendered. In this example, icon 168 is shown grayed-out and appears in phantom. Though, any suitable representation of a device that is not actively connected in the group may be used. In this example, a grayed-out icon represents a device that has been given the master key for group 110A and could re-join group 110A at a later time.

FIG. 1C illustrates that, through user interface 150, a user may enter a command that may place a device in a disconnected state. For example, a user, through manipulation of a mouse or other human interface device, may select an icon. In response to such a selection, computing device 120 may present a menu, allowing a user to input a command controlling the connection of the selected device. In the state illustrated in FIG. 1C, a user has selected icon 170 corresponding to remote device 140. In response, computing device 120 has presented menu 180. Menu 180 contains, in this example, options for selecting one of multiple commands. In this example, an option to select between two commands, commands 182 and 184, is shown.

Command 182 corresponds to a disconnect command. Upon user selection of disconnect command 182, computing device 120 may take action that precludes remote device 140 from communicating as part of group 110A. That action, for example, may include invalidating a transient key used by remote device 140 to encrypt or decrypt information exchanged with computing device 120. Invalidation of this transient key, though it temporarily precludes remote device 140 from participating in group 110A, does not preclude remote device 140 from re-joining the group. Specifically, the remote device may use the master key it has previously obtained to re-join the group and receive a new transient key to replace the transient key invalidated in response to user selection of disconnect command 182.

To preclude remote device 140 from re-joining group 110A, a user may select from menu 180 command 184. Command 184 is a remove command. Upon selection of remove command 184, computing device 120 may instead of or in addition to invalidating the transient key generated for remote device 140, invalidate the master key used by remote device 140.

In conventional systems in which all remote devices joined in a group are provided with the same master key, invalidating the master key for remote device 140 would invalidate the master key for all remote devices in group 110A. Accordingly, removing a device would require re-establishing a group 110B (FIG. 1B) for the remote devices that the user desires to remain joined in the group. Re-forming the group entails executing a key generation and distribution protocol, such as the WPS protocol, for each of the devices. The WPA2 protocol, or other protocol used for the peer-to-peer group, would also have to be repeated. Because the WPS protocol requires user interaction, forming a new group 110B may be undesirable.

To avoid requiring a user to form a new group as a way to exclude a removed device from re-joining the group, in some embodiments, computing device 120 may be configured to provide a unique master key for each remote device that joins group 110A. Unique master keys may be generated for each device by repeating the key generation protocol for each device. Thereafter, when a remote device seeks to authenticate to the computing device 120, the computing device 120 may access the appropriate master key for the device. That unique master key could then be used to authenticate the device and generate a transient key for the device. Thereafter, communication between computing device 120 and the remote device could be performed as in a conventional peer-to-peer protocol until an event is encountered that triggers computing device 120 to remove a remote device from the group. Such a triggering event, for example, may be a user selecting command 184 (FIG. 1C).

Regardless of an event triggering removal of a device from a group, in response to such an event, computing device 120 could invalidate the master key assigned to the device to be removed. Invalidating a master key for a remote device precludes that remote device from re-joining a group. However, because all of the other remote devices that are joined in group 110A may have unique master keys, invalidating the master key for remote device 140 does not impact the validity of the master keys assigned to other devices, such as remote device 132, 134 and 136. Accordingly, those remote devices are not impacted by the removal of remote device 140.

Figure 2:
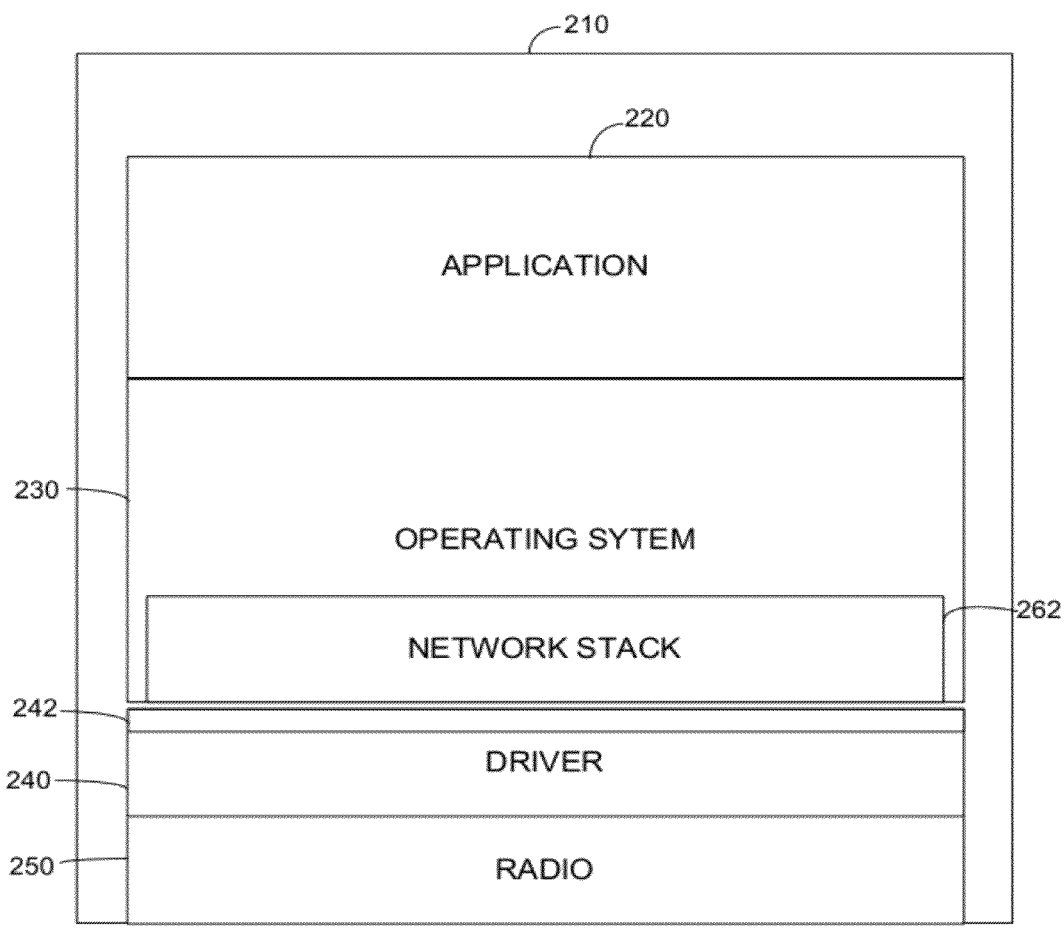
FIG. 2 is a high level bock diagram of an illustrative computing device that may serve as a group controller of the group of FIG. 1A.

Computing device 120 may be configured in any suitable way to provide unique master keys for each remote device that joins in a group according to a peer-to-peer protocol. FIG. 2 is an example of an architecture for a computing device 210, which may represent an embodiment of a computing device, such as computing device 120, that may act as a controller for a peer-to-peer group.

FIG. 2 illustrates, at a high level, an architecture for computing device 210 that may be operated to transmit and/or receive information as part of exchanges with remote devices joined in a peer-to-peer group. In the example of FIG. 2, computing device 210 includes a radio 250. Radio 250 may be adapted to send and receive wireless communications. Radio 250, for example, may be used for wireless communication in a frequency spectrum that is above 2 GHz and below 6 GHz. Such frequencies are appropriate for communication in accordance with a Wi-Fi Direct protocol. Though, it should be appreciated that any suitable spectrum and any suitable protocol may be used.

In the example of FIG. 2, an application 220 is illustrated. Application 220 may generate information for wireless transmission or may process information received wirelessly. In the embodiment illustrated, that information may be sent to or received from one or more remote devices joined in a peer-to-peer group. Accordingly, application 220 may represent any suitable application that generates or processes information exchanged in a peer-to-peer group. It may, for example, be an application for processing photographs or a word processing application that generates text for printing. Though, in some instances, application 220 may perform any suitable actions, including actions that connect or disconnect from devices in a peer-to-peer group. As an example, in some embodiments, action described as being done by a user may done indirectly by the user by initiating execution of application 220.

In the example of FIG. 2, application 220 interfaces with operating system 230. In some embodiments, operating system 230 may be a general purpose operating system, such as the WINDOWS® operating system. Such a configuration may be desirable when computing device 210 executes applications other than application 220. Though, in embodiments in which computing device 210 is configured specifically for communication as part of a peer-to-peer group, operating system 230 may have more limited functionality.

Regardless of whether operating system 230 is a special purpose or general purpose operating system, in the embodiment illustrated, a function of operating system 230 is to provide services that facilitate wireless transmission and reception of information processed by application 220. For transmission, operating system 230 may receive a request from application 220 to establish a connection with a nearby device. Thereafter, operating system 230 may receive from application 220 a stream of data representing audio/video content to be transmitted over that connection. Such a connection may be formed using techniques as are known in the art. In the illustrated example, that connection may be a direct, device-to-device connection. Though any suitable technique may be used.

In the embodiment illustrated, operating system 230 includes a network stack 262. Network stack 262 may perform functions as are known in the art for wireless communication, including successively formatting data from application 220 in accordance with different protocol layers used as part of the wireless communication. Network stack 262 may perform a reverse operation on received information by successively checking compliance with various protocol layers and removing header and other information added in accordance with those protocol layers to recover data intended for use by application 220. Such processing may be performed using techniques as are known in the art.

To send and receive data, stack 262 may interact with one or more radios, of which radio 250 is illustrated. Radio 250 may be controlled through software, represented as driver 240 in FIG. 2. Here, driver 240 includes an interface 242 through which operating system 230 may issue commands to driver 240 and through which driver 240 may report status and notify operating system 230 of received data. Interface 242 may be implemented in any suitable way, including according to a known standard. An example of such a known standard is called NDIS, but that standard is not critical to the invention.

Interface 242 may support a number of commands in a format that does not depend on the construction of radio 250. These commands may include commands to configure radio 250 for transmission at certain frequencies or to use certain modulation schemes or error control coding for symbols to be transmitted. Additionally, through interface 242, driver 240 may receive data for transmission by radio 250.

Regardless of the specific commands, driver 240 may translate the commands, in the standardized format of interface 242, into specific control signals that are applied to radio 250. Additionally, driver 240 may be programmed to perform certain low level functions associated with a wireless connection. For example, upon receipt of a packet, driver 240 may check that the packet is properly formatted. If the packet is properly formatted, driver 240 may control radio 250 to generate an acknowledgement. Conversely, if the packet is not properly formatted, driver 240 may control radio 250 to transmit a negative acknowledgement.

Though driver 240, and in some instances radio 250, may automatically perform low level functions associated with establishing and maintaining a wireless connection, higher level functions may be performed under control of operating system 230 or applications 220. In some embodiments, an application 220 or operating system 230 may provide a user interface such that ultimate control of wireless communication is provided by a user of computing device 210.

The architecture illustrated in FIG. 2 may be modified in any suitable way to configure computing device 210 to issue, use and selectively invalidate a unique master key for each device joining a peer-to-peer group. For example, components to control such operation of computing device 210 may be incorporated within application 220, operating system 230 or within driver 240. In some embodiments, some or all of the functions of a controller may be implemented in radio 250. Accordingly, the specific components configured for implementation of the controller functions are not critical to the invention.

Figure 3:
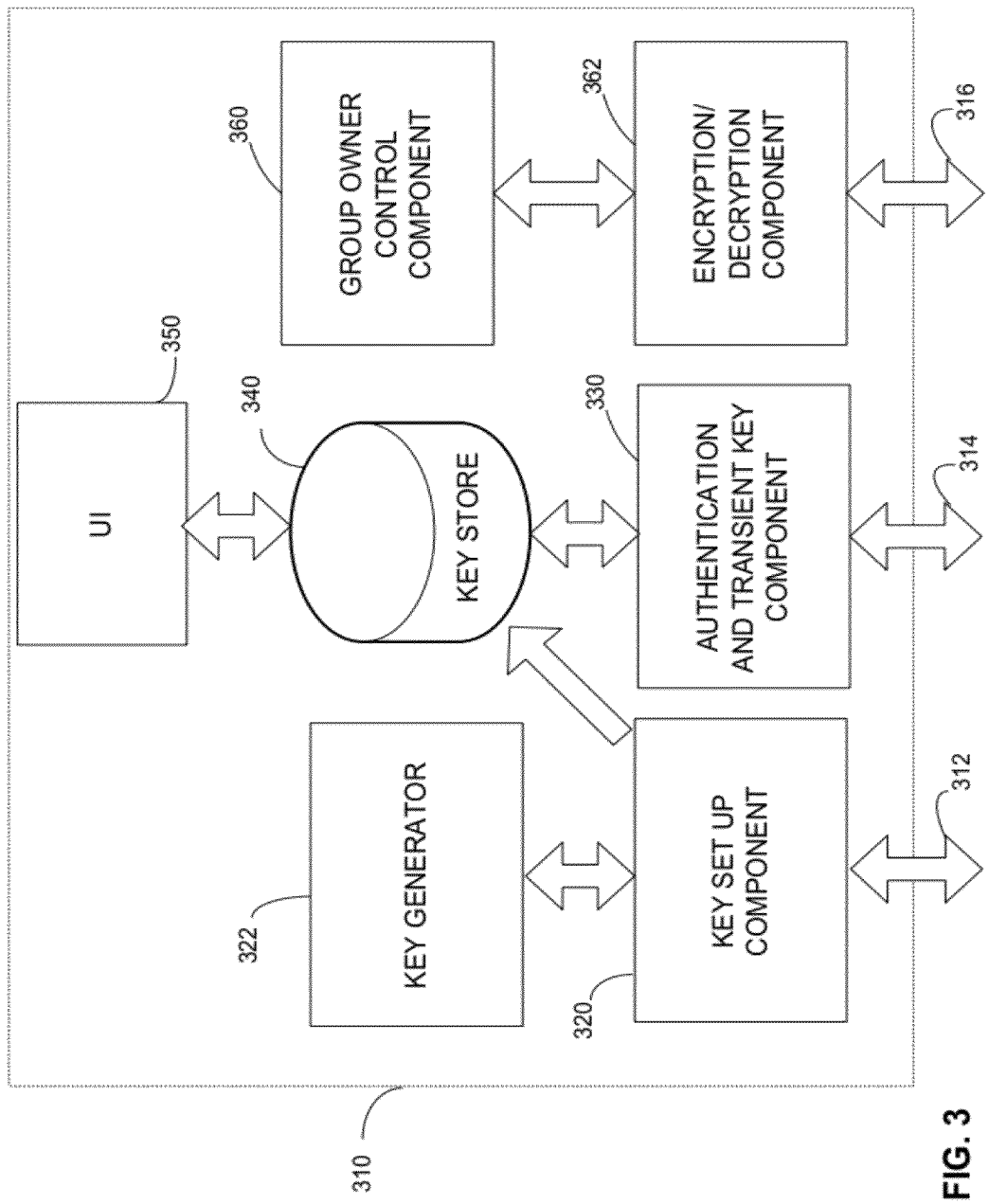
FIG. 3 is a block diagram of an illustrative embodiment of components within the computing device of FIG. 2 that control interactions with remote devices in the group.

FIG. 3 illustrates a controller 310 that may be incorporated into any suitable portion of the architecture of computing device 210. Controller 310, for example, may be incorporated into operating system 230. As a specific example, controller 310 may be incorporated into network stack 262. Though, it should be appreciated that it is not a requirement that all of the components of controller 310 be implemented in a single portion of the architecture of computing device 210. The components of controller 310, for example, may be distributed across multiple components.

In the example illustrated, controller 310 includes interfaces 312, 314 and 316, which are configured for connecting to portions of stack 262 where frames representing wireless communication in accordance with a peer-to-peer protocol may be diverted to controller 310 and where such frames may be passed to stack 262 for wireless transmission. In the embodiment illustrated, each of the interfaces 312, 314 and 316 may be integrated into stack 262 such that frames in accordance with the peer-to-peer protocol implemented by computing device 210 may pass between controller 310 and stack 262. Though three interfaces are illustrated, it should be appreciated that any number of interfaces may be provided. For example, a single interface may be provided or more than three interfaces may be provided to accommodate different types of interactions between controller 310 and stack 262. Moreover, it should be appreciated the form of these interfaces is not critical to the invention and the specific form of the interfaces may depend on the implementation of controller 310. For example, the interfaces may be implemented as defined application programming interfaces (APIs) and controller 310 may be implemented in way that it makes calls on the interfaces. Though, it other embodiments, interfaces 312, 314 and 316 may be any other form of connection.

FIG. 3 illustrates that controller 310 may be implemented with multiple components. FIG. 3 may represent a software architecture for controller 310, with each of the designated components being implemented as a separate module, such as a dynamically linked library. Though, the specific structure of each component is not critical to the invention and any suitable structure may be used in implementing the functionality of controller 310.

In the illustrated embodiment of FIG. 3, controller 310 includes a key setup component 320. Key setup component 320 may control interactions with a remote device during a setup phase for the device in which controller 310 and the remote device each arrive at the same unique master key for the remote device.

Setup component 320 may interact with the remote device in any suitable way. As one example, setup component 320 may interact via interface 312 and stack 262 such that frames that constitute exchanges of messages between computing device 210 and a remote device, may pass to setup component 320 for processing or may be generated by setup component 320 for transmission to the remote device. The specific message that pass through interface 312 for processing by setup component 320 may depend on the protocol used for the peer-to-peer group being formed. As one example, these messages may be formatted as management frames defined by the peer-to-peer protocol. One or more of these frames may include information elements indicating a request or a response to a request that is not expressly provided for in the protocol.

For example, an initial message may indicate a request from a remote device to obtain a master key for use in joining or communicating within the group. Other messages may include responses by which such a key is generated.

In response to such message, key setup component 320 may determine whether the remote device is authorized to receive a master key. Key setup component 320 may determine if a remote device is authorized in part based on an exchange of messages with the remote device. Key setup component 320 may access additional authentication information to determine whether the remote device is authorized to receive a master key.

Those additional sources of authentication information may include interaction with a user. Such interactions may be performed through user interface component 350 or in any other suitable way. In some embodiments, for example, key setup component 320 may, through user interface 350, prompt a user to provide a PIN or other suitable identification code associated with an authorized remote device. Key setup component 320 may use this identification code to verify whether messages received from the remote device were generated using the same identification code. Though, it should be appreciated that the specific source of the authentication information is not critical to the invention and it need not be provided directly by a user through a user interface. As an example of an alternative source of such authenticating information, computing device 210 may maintain a store (not shown) of PIN numbers for authorized devices, which key setup component 320 may access when receiving a request for a master key from a device seeking to join a peer-to-peer group.

The specific messages processed by key setup component 320 are not critical to the invention. In some embodiments, key setup component 320 may be configured to implement the Wi-Fi Protected Setup protocol (WPS) when receiving a request for a master key and communicating the master key to the remote device, if the remote device is authorized to receive the master key.

To obtain a master key, when the remote device is authorized to receive one, key setup component 320 may interact with key generator 322. Key generator 322 may utilize cryptographic techniques to generate a key in response to a request from key setup component 320. Key generator 322 may operate according to known cryptographic principles and may be implemented using techniques as are known in the art. However, in contrast to a conventional wireless computing device implementing a peer-to-peer group, key generator 322 and key setup component 320 may interact such that a unique master key is generated for each remote device requesting to join the group.

Key setup component 320 may record the unique master keys for subsequent use in authenticating the remote devices.

In the example of FIG. 3, key setup component 320 records master keys in key store 340. Key store 340 may represent any suitable computer storage medium on or accessible to computing device 210. Key store 340 may be implemented in non-volatile storage medium, such as a disk drive, and, for example, may be formatted as a file or other data structure maintained by a file management system on computing device 210. Though, in other embodiments, key store 340 may be stored in an encrypted format and may have no readily recognizable structure in the non-volatile storage medium. Accordingly, it should be appreciated that the specific implementation of key store 340 is not critical to the invention.

Other components within controller 310 may perform other functions associated with interactions with one or more remote devices in connection with a peer-to-peer group, including use and selective invalidation of the master keys in key store 340. For example, FIG. 3 shows that controller 310 may also include an authentication and transient key component 330. Authentication and transient key component 330 may interact with a remote device seeking to connect with other devices in the peer-to-peer group. Authentication and transient key component may validate that the remote device seeking to connect as a member of the group possesses a valid master key for the group.

Accordingly, authentication and transient key component 330 may interact with key store 340 to verify that the remote device has access to a valid master key for the group. Upon authenticating a remote device, authentication and transient key component may generate one or more transient keys for use in encrypting and/or decrypting communications with the remote device. As part of generating the transient key. Authentication and transient key component 330 may interact with the remote device. Accordingly, authentication and transient key component 330 is shown having an interface 314, which may connect to stack 262 (FIG. 2) or other suitable component that allows authentication and transient key component 330 to exchange messages with the remote device.

The exchanged messages allow the remote device to generate transient key or keys that match the keys generated by authentication and transient key component 330. In this way, authentication and transient key component 330 may provide a transient key or keys to the remote device.

Authentication and transient key component 330 may interact with the remote device using messages appropriate for the peer to peer protocol used in forming the group. In some embodiments, authentication and transient key component 330 may implement a four way hand shake in accordance with the WPA2 protocol and may therefore be implemented using techniques as are known in the art. However, in contrast to a conventional computing device serving as a controller for a peer-to-peer group, authentication and transient key component 330 may access key store 340 to obtain the unique device key for the remote device attempting to connect to the peer-to-peer group.

Figure 4A:
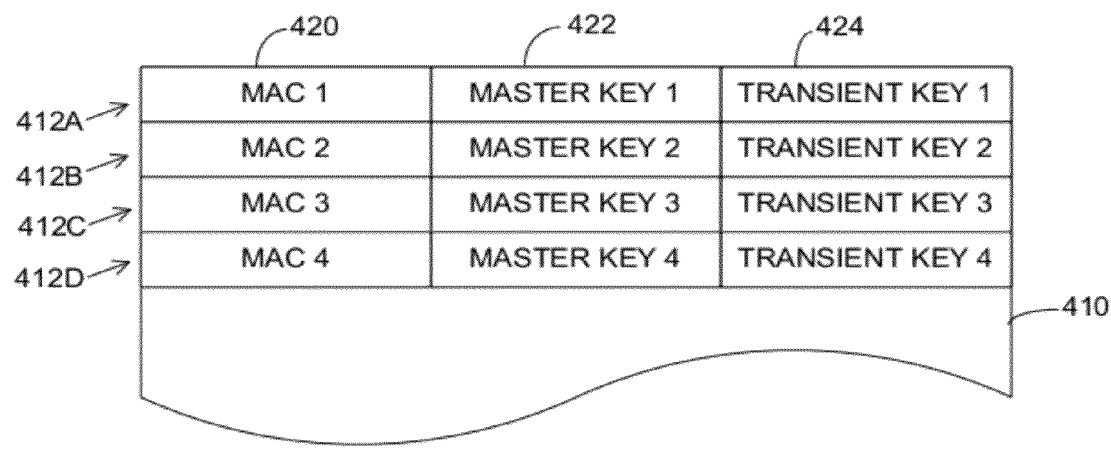
FIG. 4A is a schematic representation of an illustrative embodiment of the key store of FIG. 3.

Authentication and transient key component 330 may retrieve the unique master key applicable to the remote device in any suitable way. For example, FIG. 4A illustrates a possible organization of data maintained in key store 340, which may allow authentication in transient key component 330 to obtain the appropriate unique master key for the remote device. In the example of FIG. 4A, a data set 410 represents information in key store 340 for the set of remote devices for which unique master keys have been generated. In this example, each remote device is represented by a record in data set 410. In FIG. 4A four record, 412A, 412B, 412C and 412D are illustrated, each of the records 412A . . . 412D corresponds to a remote device.

In this example, each of the records has the same format. Taking record 412A as illustrated, the record contains multiple fields. In this example, three fields, fields 420, 422 and 424 are shown. Field 422 stores a value indicating the master key for a remote device associated with record 412A. Field 420 contains a value that may be used to identify the remote device. In this example, Field 420 stores a value representing a Media Access Control (MAC) address for the remote device. In accordance with some peer-to-peer protocols, the MAC address of a device sending or intended to receive a frame is incorporated into the frame. Accordingly, key setup component 320 may have access to the MAC address of a remote device at the time it generates a unique master key for the device. When key setup component 320 generates a unique master key and writes a record to key store 340, it may include in that record a value of the MAC address for the remote device. Authentication and transient key component 330 may similarly receive a MAC address for a remote device in conjunction with messages from a remote device seeking to be authenticated as part of connecting in the peer-to-peer group. Accordingly, authentication and transient key component 330 may identify an appropriate master key for a remote device by comparing a MAC address received from the remote device with a MAC address stored in data set 410.

Figure 4B:
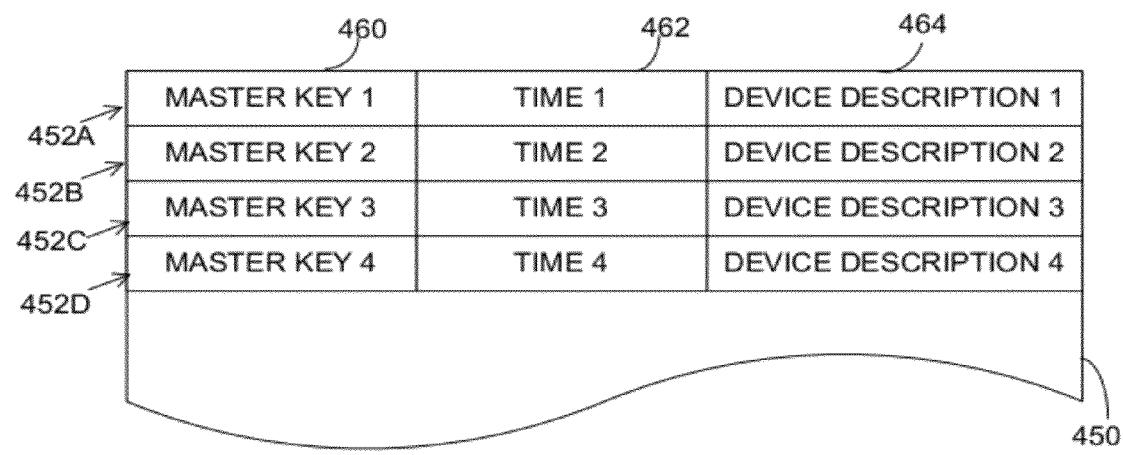
FIG. 4B is a schematic illustration of an alternative embodiment of the key store of FIG. 3.

Though, other mechanisms are possible. For example, FIG. 4B illustrates an alternative embodiment of a data set 450 that may constitute key store 340. Data set 450, in this example, contains a structure similar to that of data set 410. Multiple records 452A, 452B, 452C and 452D are illustrated. Each such record may correspond with a remote device for which a master key has been generated. Taking record 452 as illustrated, each record may include fields such as fields 460, 462 and 464. Field 460 may contain a value of the master key. In this example, fields 462 and 464 do not contain identification information comparable to that in field 420 (FIG. 4A). Rather, fields 462 and 464 contain information that may be used in other operations. For example, field 462 may contain a value defining a time at which the master key was generated. Such information, for example, may be used in an embodiment in which keys time out or devices otherwise are removed from a group after some threshold period of time. Field 464 may contain information useful, for example, in rendering a user interface such as user interface 150. Field 464, for example, may contain a code or other description of the device for which the master key was generated. Such information may be used by user interface component 350 to select icons to use in interface 150.

In this example, data set 450 does not include MAC addresses or other direct identification of the remote devices. Nonetheless, authentication and transient key component 330 may use data set 450 to determine whether the remote device requesting authentication has a valid master key.

As part of the protocol applied by authentication and transient key component 330 to determine whether a remote device as a valid key, authentication and transient key component 330 performs a cryptographic function on a block of data sent by the remote device. In accordance with the protocol used by authentication and transient key component 330, the remote device is expected to encrypt with a valid master key a block of data having a value known by authentication and transient key component 330. Authentication and transient key component 330 authenticates the remote device if it can decrypt a block of data received from the remote device to generate that known value. Accordingly, even if authentication and transient key component 330 does not know the specific master key used by the remote device, if any of the master keys in data set 450 can be used to decrypt the received block of data in order to generate the expected value, authentication and transient key component 330 may conclude that the remote device has access to a valid master key, thereby authenticating the remote device.

Accordingly, in embodiments in which a specific identifier for the remote device is not stored in data set 450, authentication and transient key component 330 may identify the appropriate master key by testing multiple master keys in the data set until a master key can be used to appropriate decrypt the block of data is identified. That master key can thereafter be used in the generation of a transient key for the remote device.

Regardless of the manner in which authentication and transient key component 330 identifies the appropriate master key for the device requesting connection to the peer-to-peer group, once the appropriate master key is identified, authentication and transient key component 330 may use the master key to provide a transient key to the remote device for connection to the peer-to-peer group.

FIG. 3 illustrates that controller 310 includes a group owner control component 360. Group owner control component 360 may perform operations as are known in the art for a computing device operating as a controller for a peer-to-peer group. In the embodiment illustrated, device 210 may be programmed to operate in accordance with the Wi-Fi Direct protocol. In that protocol, devices forming a group may exchange messages by which one of the devices is identified as a group owner. The group owner performs control functions for the group, including provisioning devices that form part of the group such that the devices may appropriately send and receive data. In the embodiment illustrated, the group owner also participates in routing the data between devices that are admitted to the group. These operations, and any other suitable operations, may be performed by group owner control component 360.

Operations performed by group owner control component 360 may entail sending and receiving data from one or more of the remote devices that are connected in the peer-to-peer group. Such data may be communicated in an encrypted format. Accordingly, group owner control component 360 may be coupled to interface 316 through encryption/decryption component 362. Interface 316 may couple encryption/decryption component 362 to stack 262 (FIG. 2) or other component of computing device 210 that facilitates the transmission and receipt of information exchanges wireless with the remote device.

Group owner control component 360 and encryption/decryption component 362 may be implemented in any suitable way, including using components as are known in the art. These components may operate such that data frames or other frames exchanged with a remote device that is connected in the peer-to-peer group may be encrypted with the transient key generated for that remote device. Encryption/decryption component 362 may access such a transient key in any a suitable way. For example, authentication and transient key component 330 may generate a key table or other suitable data structure linking transient keys with addresses used by remote devices to communicate as part of the peer-to-peer group.

As one example, FIG. 4A illustrates that each of the records 412A, 412B, 412C and 412D in data set 410 may include a field, such as field 424 containing a transient key for the remote device represented by the record. In this example, a MAC address in field 420 may be used to selected an appropriate record from data set 410 such that a transient key may be identified for use in encrypting or decrypting data. Though, it is not a requirement that the transient keys be stored in the same data store as the master keys. In some embodiments, the transient keys may be stored in volatile memory, for example, such that the transient keys are not retained if computing device 210 powers down. Also, it is not a requirement that the transient keys be linked to a MAC address. In some embodiments, the transient keys may be linked to a group address assigned to each remote device as it is admitted to the peer-to-peer group.

Regardless of the manner in which the transient key is identified, encryption/decryption component 362 may use the transient key to encrypt and decrypt frames exchanged between group owner control component 360 and the remote device. These operations may be performed using techniques as are known in the art or in any other suitable way.

FIG. 3 also illustrates that controller 310 may include a user interface component 350. User interface component 350 may present one or more user interfaces through which information may be obtained from a user. For example, user interface component 350 may present user interface 150 (FIG. 1C) to receive user input concerning disconnecting or removing a remote device from a peer-to-peer group. Additionally, user interface component 350 may interface with a user to obtain information or commands used by key setup component 320 or other components of controller 310.

User interface component 350 may be implemented using techniques as are known in the art or in any other suitable way. User interface component 350 may be configured to respond to user input in any suitable way. For example, in response to user input received through user interface 150 indicating that a remote device is to be removed from a peer-to-peer group, user interface component 350 may modify key store 340 to invalidate a master key associated with the device to be removed. User interface component 350 may invalidate a master key in any suitable way. In some embodiments, user interface component 350 may invalidate a key either by deleting from a record associated with the device a value of the master key or deleting the entire record. Though, any suitable mechanism signifying that a master key has been invalidated may be used. For example, user interface component 350 may write a value to the record associated with the master key to indicate that the key has been invalidated.

In contrast, in response to user information received through user interface 150 to disconnect a remote device from a peer-to-peer group, user interface 350 may leave the master key value in key store 340 intact. Rather, user interface component may delete transient keys or other data structures used to establish the connection with the remote device to be disconnected. But, leaving the master key in key store 340 allows the disconnected remote device to reconnect at a later time.

Figure 5A:
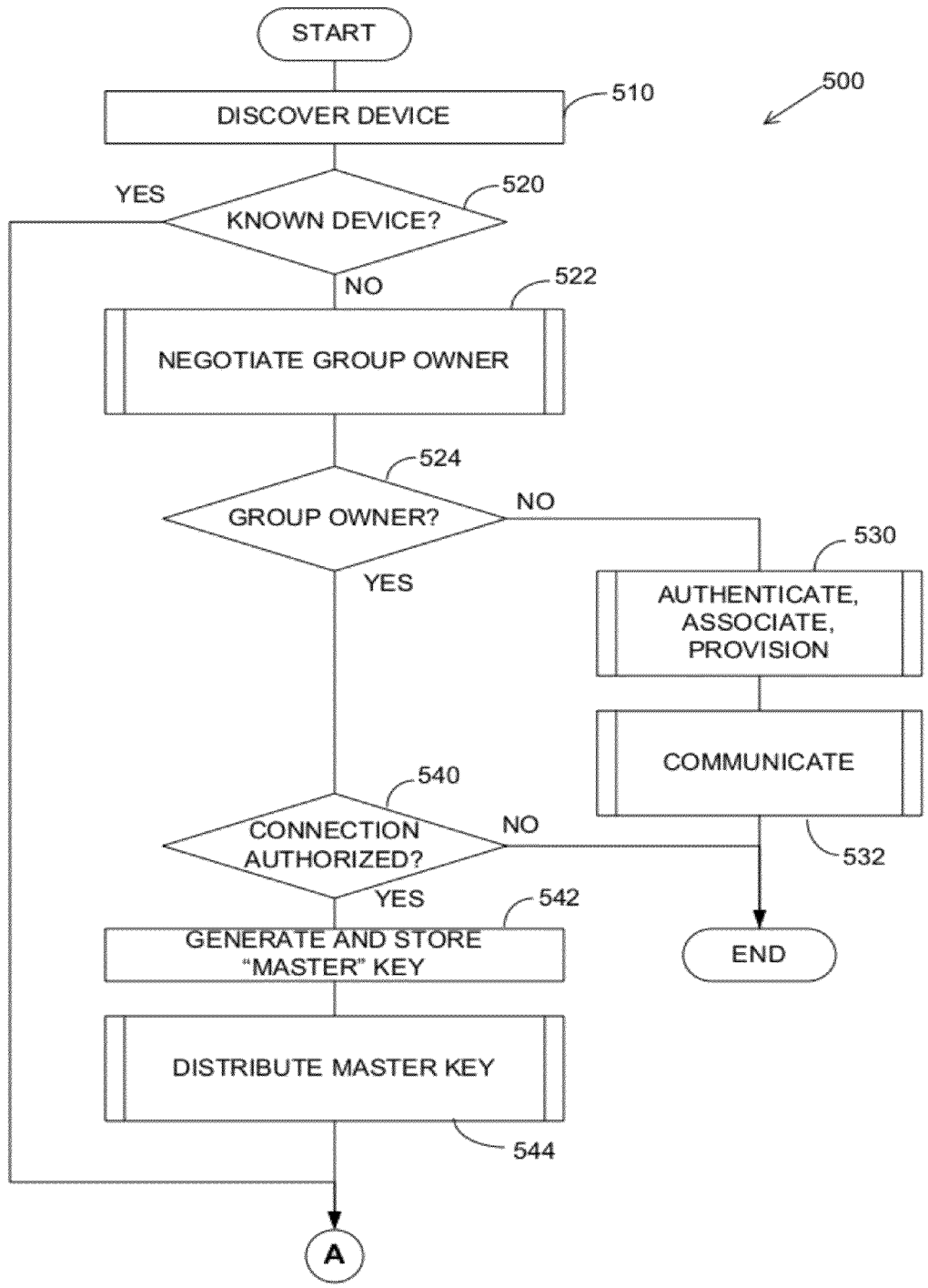
FIGS. 5A and 5B, when connected at the points labeled A, form a flow chart of an illustrative method of operation of a computing device controlling a peer-to-peer group.
Figure 5B:
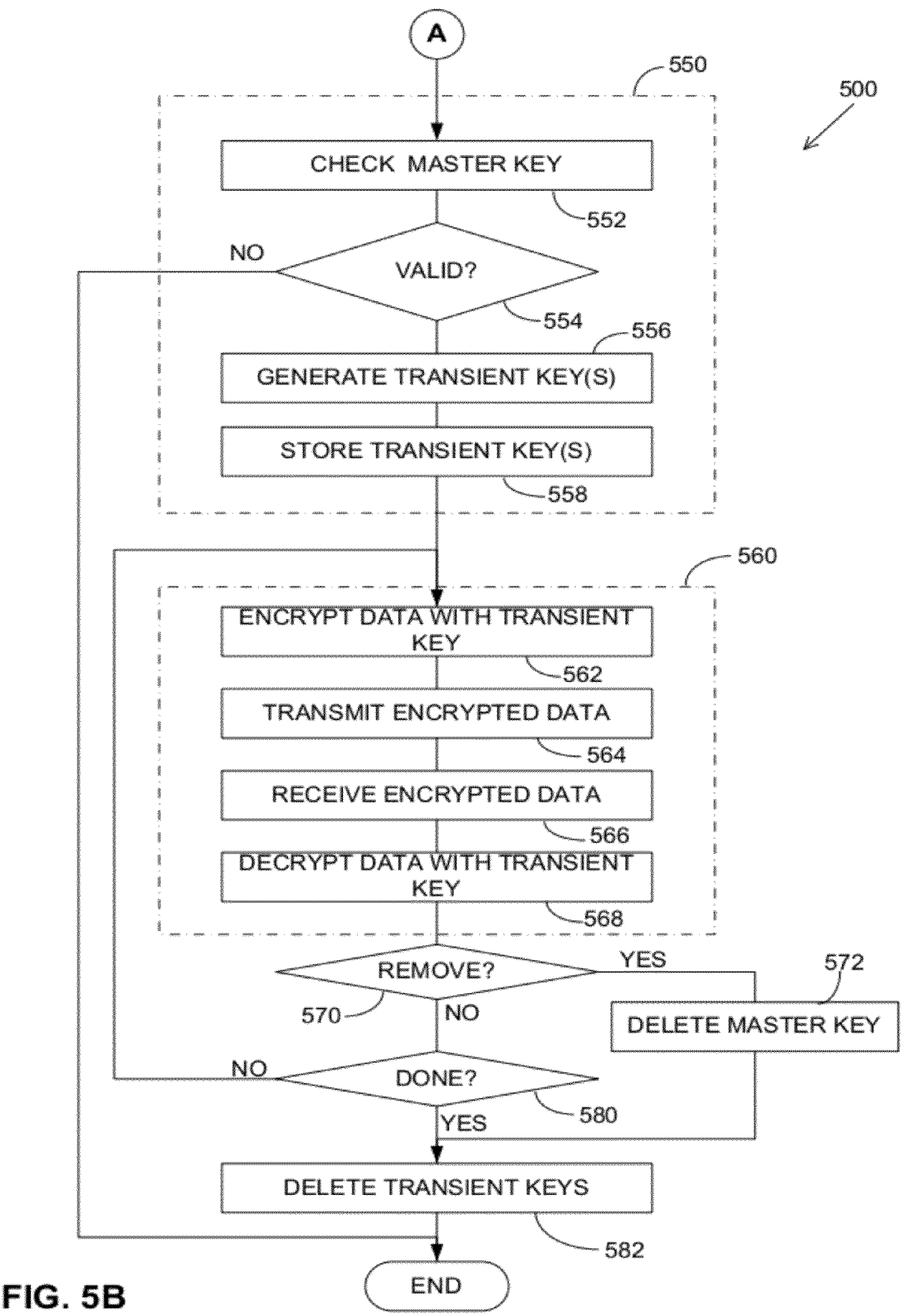

The components illustrated in FIG. 3, or any other suitable components, may interact to control computing device 210 to perform a method of secure operation in which remote devices may be selectively removed from the group. FIGS. 5A and 5B, when joined at the point labeled A, represent a flow chart of such a method of secure operation.

In the example of FIG. 5A, method 500 begins at block 510 where a remote device is discovered. Remote discovery of a device may be performed in any suitable way and may be initiated by either the computing device executing method 500 or the remote device. Processing at block 510 may be performed in any suitable way. In the embodiment illustrated, that processing may be performed using techniques specified as part of a peer-to-peer protocol as is known in the art.

For example, processing at block 510 may include sending and/or responding to management frames. As an example, discovery at block 510 may include transmitting a beacon and/or receiving a probe request. Accordingly, the specific actions taken by which a computing device identifies that a remote device desires to engage in peer-to-peer communication is not critical to the invention. Regardless of the manner in which the device is identified, processing may proceed to decision block 520.

At decision block 520, process 500 may branch, depending on whether the remote device identified at block 510 is known to the computing device executing process 500. In this example, a device is deemed known when it is a device that has previously been admitted as a member of a peer-to-peer group controlled by the computing device executing process 500. If so, process 500 branches from decision block 520 to perform subprocess 550 (FIG. 5B).

In scenarios in which the discovered device is not known, the process 500 precedes from decision block 520 to subprocess 522. At subprocess 522, the computing device executing process 500 and the remote device may exchange further management frames to negotiate a group owner. The negotiations performed as part of subprocess 522 may be specified in the peer-to-peer protocol being used by the devices to form a peer-to-peer group. Accordingly, subprocess 522 may be performed as known in the art. In this example, the negotiations are performed in accordance with the Wi-Fi Direct protocol such that, as a result of the negotiations, one of the devices will be identified as the group owner, and will perform control functions for the peer-to-peer group.

Upon completion of the negotiations in subprocess 522, the process continue to decision block 522. At decision block 522, process 500 may branch depending on the result of the group owner negotiations conducted in 522.

If the computing device executing process 500 is not selected as the group owner, process 500 may branch from decision block 524 to subprocess 530. In scenarios in which the device executing process 500 is not identified as the group owner, no special action on the part of the device is necessary in order to receive a unique master key. Accordingly, when the process branches from decision block 524 to subprocess 530, operations within subprocess 530 may be conventional operations as are appropriate for a computing device designated to have the role of a client device in the peer-to-peer network.

Processing within subprocess 530 may result in the client authenticating and associating with the device selected as the group owner as a result of the negotiations conducted in subprocess 522. Additionally, subprocess 530 may include provisioning steps, as in a conventional peer-to-peer network. Regardless of the specific steps taken, upon execution of subprocess 530, the computing device may be equipped for communication with the selected group owner. Accordingly, from subprocess 530, the process 500 may proceed to subprocess 532 where the computing device executing process 500 and the remote device discovered at block 510 may communicate using techniques as are known in the art. Such communication may continue for any amount of time, but when communication is completed, process 500 may end.

Conversely, when, as a result of negotiations in subprocess 522, the computing device executing process 500 is identified as the group owner, the process branches from decision block 524 to decision block 540. Processing at decision block 540 may determine, in any suitable way, whether the device discovered at block 510 is authorized to join the group being controlled by the device executing process 500. As an example, user input may be provided indicating whether the device is authorized.

The input may be in a form that allows cryptographic functions used in communications with the remote device that can indicate whether the device is authorized. For example, the controlling device executing process 500 may send a message containing text or a numeric code that operates as a challenge phrase. The remote device may encrypt that challenge phrase with the PIN or other valued derived from authentication information to perform a cryptographic function on the challenge phrase. The cryptographic function, may involve encryption, digital signing, a hash function or other suitable cryptographic function.

Regardless of the specific cryptographic function performed, the remote device may then send back to the controlling device the challenge phrase suitably processed. The controlling device may perform a similar operation on the challenge phrase based on the authentication information provided by the user. If the processed value generated by the controlling device matches the value returned by the remote device, the controlling device may deem that the remote device is authorized to connect to the peer-to-peer group. Though, it should be appreciated that such an exchange of messages based on authentication information provided by a user is just one example of an approach that the controlling device may use to determine whether the remote device is authorized to join the group. Regardless of the manner in which the authorization is validated, if the remote device is not authorized for access to the group, the process may branch from decision block 540 to the end of the process such that the remote device is not granted access to the peer-to-peer group.

Conversely, if, as a result of processing at decision block 540, the controlling device determines that the remote device is authorized to join the peer-to-peer group, the process branches from decision block 540 to block 542. At block 542, the controlling device may generate and store a unique master key for the remote device. The master key may be generated in any suitable way, such as through the use of a random number generator and/or computations involving one or more cryptographic functions.

Regardless of the manner in which the master key is generated, process 500 may proceed to subprocess 544. At subprocess 544, the master key may be distributed to the remote device. Subprocess 544 may be performed in any suitable way. In some embodiments, the controlling device may convey the master key to the remote device using the Wi-Fi protected setup protocol (WPS).

Regardless of the manner in which the key is distributed, process 500 may proceed to subprocess 550 (FIG. 5B). Subprocess 550 may entail authenticating a device seeking to join the peer-to-peer group. FIG. 5B illustrates that the processing performed within subprocess 550 is the same, regardless of whether process 500 reaches subprocess 550 from subprocess 544, in which the remote device receives a unique master key, or from decision block 520 where it may be determined that the remote device already has a master key. Accordingly, subprocess 550 is shown beginning at block 552 where the controlling device checks whether the remote device has a valid master key. In embodiments in which the remote device has just been assigned a master key through subprocess 544, this processing may be bypassed.

In embodiments in which processing is performed at block 552, the controlling device may check whether the remote device seeking to join the peer-to-peer group has a valid master key through an exchange of messages. The exchange of messages, for example, may entail exchanging information between the controlling device and the remote device that allows the controlling device to determine whether the remote device has performed a cryptographic function using a valid master key. Such an exchange of communications may be performed according to any suitable protocol. In some embodiments, subprocess 550 may be performed according to a known protocol, such as the WPA2 protocol. In such an embodiment, processing performed at block 552 may be in accordance with that protocol, though the specific protocol used is not critical to the invention.

However, a difference between the processing at block 552 and a conventional process for checking the validity of a master key of a remote device is that, at block 552, the controlling device may select an appropriate master key that corresponds with the remote device. The master key used by the controlling device at block 552 may be selected in any suitable way. In some embodiments, the controlling device may access a key store, such as key store 340 (FIG. 3) based on an identifier associated with the remote device. Though, in other embodiments, the controlling device may sequentially attempt to validate the master key used by the remote device against each valid master key stored in a key store until the master key applied by the remote device validates against a key in the key store, in which case the key is validated, or the controlling device unsuccessfully attempts to validate the master key used by the remote device against all of the master keys in the key store, in which case the remote device is determined not to have a valid master key.

Regardless of the technique used to validate the master key at block 552, process 500 may continue to decision block 554 where there process may branch depending on the result of that validation. If, as a result of processing at block 552, the controlling device determines that remote device does not have a valid master key, the process may branch from decision block 544 to the end of process 500 without the remote device being able to connect to the peer-to-peer group.

Conversely, if the remote device is determined to have a valid master key, the process may continue from decision block 554 to block 556. At block 556, the controlling device may generate one or more transient keys that may be distributed to the remote device. A transient key generated at block 556 may enable communication between the remote device and the controlling device. If multiple transient keys are generated, for example, one transient key may be used with the controlling device and the additional keys may be used for communication with other devices in the peer-to-peer group.

The transient keys may be generated in any suitable way. In an embodiment in which subprocess 550 is performed in accordance with the WPA2 protocol, processing at block 556 may be performed in accordance with that protocol. Though, any suitable mechanism may be used to generate transient keys and distribute those transient keys to the remote device.

Regardless of the number of transient keys generated at block 556 they may be stored at block 558 for future use in encrypting or decrypting communications with the remote device.

Process 500 may then continue to subprocess 560. During subprocess 560, the controlling device and the remote device may communicate using the transient keys generated at block 556. Subprocess 560 may include any suitable steps. In the example illustrated, processing within subprocess 560 begins with block 562. At block 562, the controlling device may encrypt data for transmission to the remote device using a transient key generated at block 556. The specific data to be transmitted to the remote device is not critical to the invention and may depend on the nature of both the remote device and the controlling device. Moreover, the manner in which the transient key is used to encrypt data at block 562 also is not critical to the invention. Encryption may provide confidentiality, authentication or integrity or some combination of those functions.

Regardless of how and why data is encrypted with the transient key, at block 564, the encrypted data may be transmitted to the remote device at block 564. Transmission of encrypted data at block 564 may be performed in any suitable way. Though, embodiments in which the peer-to-peer group is formed in accordance with a standard protocol, transmission at block 564 may be in accordance with the standard protocol. In the embodiment illustrated, the communication subprocess 560 may also include receiving data from the remote device. In this scenario, the received data may also be encrypted using the transient keys generated and transmitted to the remote device at block 556. Accordingly, data received at block 566 may be encrypted with the transient key for the remote device.

At block 568, the controlling device may decrypt the received data, also using the transient key. The received data may then be used within the controlling device. The specific use of the data is not critical to the invention and the data may be put to any suitable use.

Process 500 may then continue to decision block 570. At decision block 570, the process may branch, depending on whether a trigger event has been detected that indicates that the remote device should be removed from the peer-to-peer group. An example of a trigger advice may be user input. As a specific example, a user may select command 184 (FIG. 1C) from a user interface on the controlling device. Though, any other suitable event may serve as a trigger. For example, FIG. 4B illustrates that records in a data set 450 containing information about remote devices may include a time value, such as the time value illustrated in field 462. In some embodiments, a suitable trigger for removing a remote device from a peer-to-peer group may be passage of a predetermined amount of time. That time may be determined, for example, from a value in field 462.

Regardless of the specific trigger event, if the trigger event is detected, process 500 branches from decision block 570 to block 572. At block 572, the controlling device may invalidate the master key associated with the remote device. Processing at block 572 may be performed in any suitable way. In some embodiments, a master key may be invalidated by deleting it from a key store, such as key store 340. Though, in other embodiments, the key may be invalidated by setting a flag in a record associated with the key or in any other suitable way.

Following invalidation of the master key at block 572, process 500 may continue to block 582 where transient keys associated with the remote device may also be invalidated, such as by deletion. Following deletion of the transient keys, process 500 may end. When processing arrives at the end after having passed through blocks 572 and 582, the remote device will be unable to further communicate as in subprocess 560 because it will not have transient keys to encrypt and decrypt data. Further, the remote device will be unable to re-establish communication by repeating subprocess 550 to establish transient keys that can be used for communication. If the remote device seeks to re-establish communication, it will be forced to pass through decision block 540 where it must be reauthorized to obtain a new master key.

Though, FIGS. 5A and 5B illustrate other sequences of steps through which processing may arrive at the end of process 500. For example, if at decision block 570, no indication to remove the remote device is received, processing may proceed to decision block 580. At decision block 580, process 500 may branch, depending on whether communications have been completed. If not, processing may loop back where some or all of subprocess 560 may be repeated.

Conversely, if communications are completed, the process may branch from decision block 580 to block 582. At block 582, transient keys assigned to the remote device may be deleted, and then process 500 may end. In scenarios in which processing reaches the end without execution of block 572, the remote device may retain a valid master key. Though the remote device may lack transient keys because they were deleted at block 582, the remote device may nonetheless resume communication as part of the peer-to-peer group without further express user authorization. For example, if at a later time, the remote device attempts to re-establish communication, processing may branch through decision block 520 directly to subprocess 550 where, because the remote device retains a valid master key, the remote device may receive new transient keys. In this way, process 500 illustrates an approach by which a master key for a remote device that is part of a peer-to-peer group may be selectively removed.

Though FIGS. 5A and 5B depict interactions between a controlling device and a single remote device, it should be appreciated that process 500 may be repeated for each of multiple remote devices forming a peer-to-peer group. Processing for each of the remote devices may be independent. Accordingly, selective invalidation of a master key for one remote device does not impact the validity of the master keys held by other remote devices. Accordingly, a remote device may be selectively removed in accordance with the process of FIGS. 5A and 5B. Though, it should be appreciated that FIGS. 5A and 5B illustrate an exemplary process and any suitable processing may be used to selectively remove one or more remote devices from a peer-to-peer group.

Figure 6:
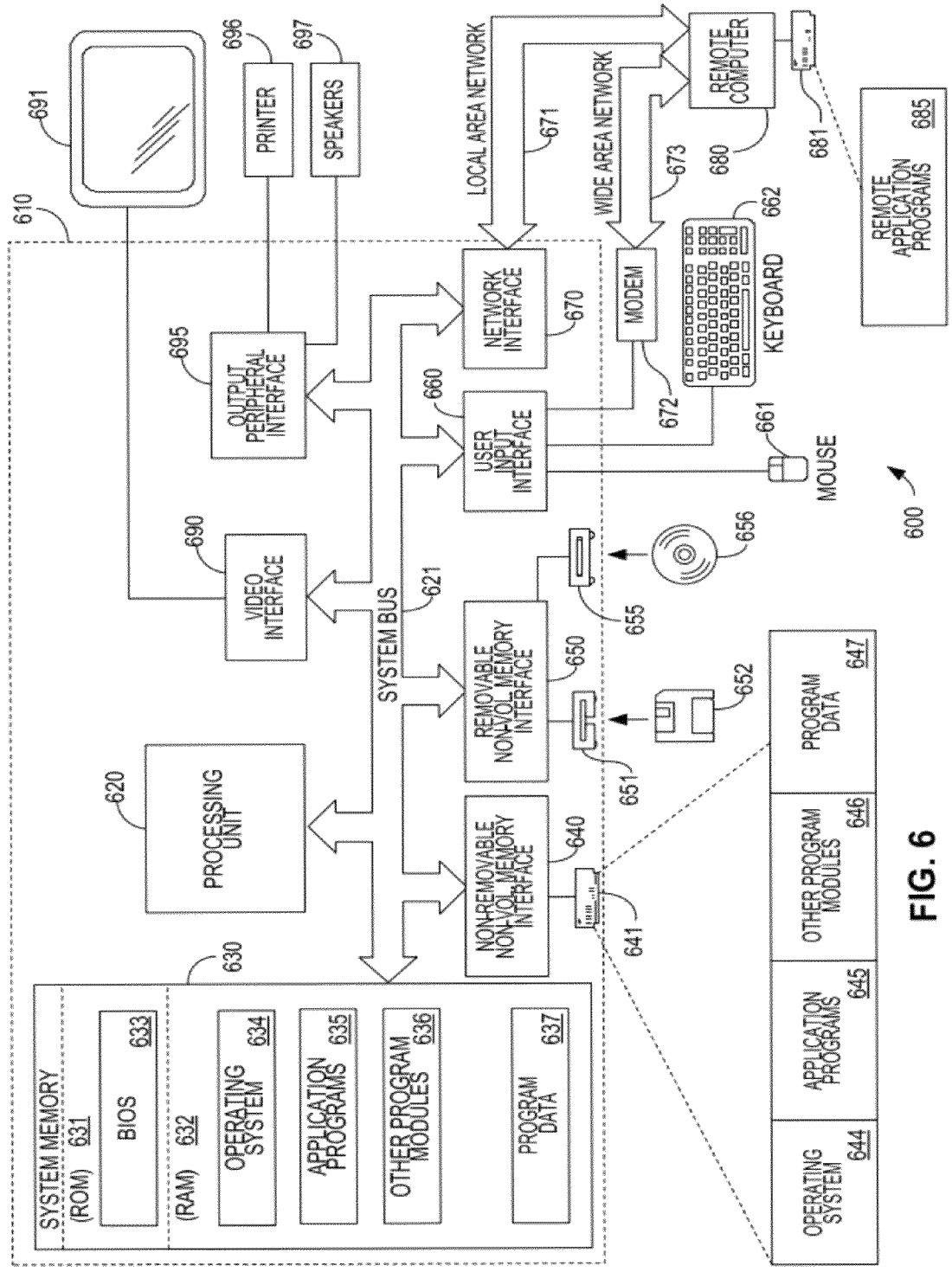
FIG. 6 is a functional block diagram of an illustrative computing device in which embodiments of the invention may be implemented.

FIG. 6 illustrates an example of a suitable computing system environment 600 on which the invention may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 6, an exemplary system for implementing the invention includes a general purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/non-removable, volatile/nonvolatile computer storage media. By way of example only, FIG. 6 illustrates a hard disk drive 640 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through an non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through a output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable storage medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of managing wireless communications, the method comprising:
    operating a wireless computing device as a controlling member of a peer-to-peer group, including:
        performing a key generation process with a first wireless device, including:
            providing a first master key to the first wireless device;
        performing a key generation process with a second wireless device, including:
            providing a second master key to the second wireless device, the second master key being different than the first master key;
        forming a peer-to-peer group including the first wireless device and the second wireless device as clients, the forming comprising:
            authenticating the first wireless device based on the first master key;
            generating a first transient key based on the first master key;
            authenticating the second wireless device based on the second master key; and
            generating a second transient key based on the second master key; and
        exchanging data with the first wireless device and the second wireless device as part of the peer-to-peer group, the exchanging comprising:
            encrypting data for transmission to the first wireless device with the first transient key; and
            encrypting data for transmission to the second wireless device with the second transient key.

2. The method of claim 1, wherein operating the wireless computing device as the controller of the peer-to-peer group further includes:
    removing the first wireless device from the peer-to-peer group, including:
        invalidating the first master key; and
        invalidating the first transient key.

3. The method of claim 2, wherein operating the wireless computing device as the controlling member of the peer-to-peer group further includes:
    after invalidating the first master key and invalidating the first transient key, exchanging data with the second wireless device as part of the peer-to-peer group.

4. The method of claim 2, wherein operating the wireless computing device as the controlling member of the peer-to-peer group further includes:
    performing a group owner negotiation with at least the first wireless device, whereby the wireless computing device is selected as a group owner.

5. The method of claim 2, wherein:
    operating the wireless computing device as the controlling member of the peer-to-peer group further includes:
    storing the first master key and the second master key in a key store; and invalidating the first master key comprises:
    deleting the first master key from the key store.

6. The method of claim 2, wherein:
    operating the wireless computing device as the controlling member of the peer-to-peer group further includes:
        receiving a user request to remove the first wireless device from the peer-to-peer group; and
    invalidating the first master key is performed in response to the user request.

7. The method of claim 1, wherein operating the wireless computing device as the controlling member of the peer-to-peer group further includes:
    at a first time, disconnecting the second wireless device from the peer-to-peer group; and
    at a second time, reconnecting the second wireless device to the group, the reconnecting comprising:

authenticating the second wireless device based on the second master key; and generating a further transient key based on the second master key.

8. A computing device comprising:
a radio;
at least one processor; and
computer storage medium storing computer-executable components for execution on the at least on processor, the computer-executable components comprising:
   a peer-to-peer control component configured to operate the computing device as a group owner of a peer-to-peer group of multiple remote devices, and to control the peer-to-peer group in accordance with a peer-to-peer protocol;
   a key generator, the key generator configured to provide a master key to each of the multiple remote devices, wherein the master key for each of the multiple remote devices is different than the master key for every other remote device of the multiple remote devices; and
   an authentication component, the authentication component configured to:
      determine whether a remote device attempting to join the peer-to-peer group has a valid master key; and
      in response to a determination that the remote device attempting to join the peer-to-peer group has the valid master key, generate a transient key for the remote device based on the valid master key.

9. The computing device of claim 8, wherein:
the computing device further comprises a data store for storing master keys generated by the key generator; and
the authentication component is further configured to determine whether the remote device attempting to join the peer-to-peer group has the valid master key by processing a message received from the remote device with a key in the data store.

10. The computing device of claim 9, wherein:
the computer executable components further comprise:
   a component to remove a master key associated with the remote device from the data store in response to a user request to remove the remote device from the peer-to-peer group.

11. The computing device of claim 10, wherein:
the authentication component is further configured to determine whether the remote device attempting to join the peer-to-peer group has the valid master key by performing a handshake in accordance with a WPA2 protocol.

12. The computing device of claim 9, wherein:
the radio operates in a frequency band above 2 GHz and below 6 GHz.

13. At least one computer readable storage medium comprising a memory, or a disk, that stores computer executable instructions that, when executed by a processor of a controller device, perform a method comprising:
performing a key generation process with each of a plurality of remote devices, the key generation process comprising, for each remote device of the plurality of remote devices:
   providing a master key to that remote device; and
   storing the master key for that remote device in a key store;
forming, as a controlling member, a peer-to-peer group of the controller device and at least a subset of the plurality of remote devices, the forming comprising, for each remote device in the subset:
   authenticating that remote device based on the master key stored in the key store for that remote device; and
   generating a transient key for that remote device based on the master key stored in the key store for that remote device; and
exchanging data with the remote devices in the peer-to-peer group, the exchanging comprising, for one or more remote devices in the group:
   encrypting data to be sent to that remote device with the transient key generated for that remote device.

14. The at least one computer readable storage medium of claim 13, wherein the method further comprises:
removing a particular remote device from the peer-to-peer group, the removing comprising:
   invalidating the master key for the particular remote device.

15. The at least one computer readable storage medium of claim 14, wherein the removing is performed in response to user input.

16. The at least one computer readable storage medium of claim 15, wherein the method further comprises:
disconnecting another remote device from the peer-to-peer group, the disconnecting comprising:
   invalidating the transient key generated for the other remote device.

17. The at least one computer readable storage medium of claim 16, wherein:
the computer executable instructions for forming the peer-to-peer group:
   readmit the disconnected other remote device to the peer-to-peer group; and
   deny the removed particular remote device access to the peer-to-peer group.

18. The at least one computer readable storage medium of claim 16, wherein:
storing the master key for that remote device comprises:
   storing the master key in the key store in connection with data describing that remote device.

19. The at least one computer readable storage medium of claim 18, wherein the method further comprises:
rendering a user interface for receiving peer to peer group management commands, the user interface comprising:
   a display area presenting icons representing remote devices in the peer-to-peer group, each icon being based on the data in the key store that describes a corresponding remote device; and
   a command menu presenting a first command to disconnect a first remote device from the peer-to-peer group and a second command to remove a second remote device from the peer-to-peer group.

20. The at least one computer readable storage medium of claim 15, wherein the method further comprises:
rendering a user interface comprising:
   a display area through which a specific remote device of the peer-to-peer group is selectable;
   a first actuatable command area to request disconnection of a selected remote device from the peer-to-peer group; and
   a second actuatable command selectable to request removal of a selected remote device from the peer-to-peer group.

* * * * *